(12) United States Patent
Fineman et al.

(10) Patent No.: US 8,738,409 B2
(45) Date of Patent: May 27, 2014

(54) SYSTEM AND METHODS FOR PRIORITIZING AND PROCESSING UPDATED INVENTORY INFORMATION FOR EVENT LISTINGS

(75) Inventors: Charles Fineman, Berkeley, CA (US); Mats G. Nilsson, Kentfield, CA (US)

(73) Assignee: Stubhub, Inc., San Francisco, CA (US)

( * ) Notice: Subject to any disclaimer, the term of this patent is extended or adjusted under 35 U.S.C. 154(b) by 856 days.

(21) Appl. No.: 12/346,981

(22) Filed: Dec. 31, 2008

(65) Prior Publication Data

US 2010/0169130 A1    Jul. 1, 2010

(51) Int. Cl.
*G06Q 10/00* (2012.01)
*G06Q 30/00* (2012.01)

(52) U.S. Cl.
USPC ............................. 705/5; 705/1.1; 705/7.35

(58) Field of Classification Search
USPC .................. 705/1.1, 5–6, 7.11–7.42, 400
See application file for complete search history.

(56) References Cited

U.S. PATENT DOCUMENTS

| | | | |
|---|---|---|---|
| 6,229,621 B1 * | 5/2001 | Kulakowski et al. ........ 358/1.15 |
| 6,240,396 B1 * | 5/2001 | Walker et al. ................. 705/26 |
| 6,772,506 B2 | 8/2004 | Toensing |
| 7,206,755 B1 * | 4/2007 | Muralidhar .................. 705/26 |
| 2003/0069827 A1 * | 4/2003 | Gathman et al. ............. 705/37 |
| 2003/0069829 A1 * | 4/2003 | Gathman et al. ............. 705/37 |
| 2004/0093302 A1 | 5/2004 | Baker |
| 2008/0103934 A1 | 5/2008 | Gibson |
| 2008/0133305 A1 * | 6/2008 | Yates et al. .................. 705/8 |
| 2008/0235110 A1 | 9/2008 | Carter |
| 2010/0113072 A1 | 5/2010 | Gibson |
| 2010/0131366 A1 | 5/2010 | Gibson |
| 2010/0131530 A1 | 5/2010 | Gibson |
| 2010/0133339 A1 | 6/2010 | Gibson |

\* cited by examiner

*Primary Examiner* — George Chen
(74) *Attorney, Agent, or Firm* — Haynes and Boone, LLP

(57) ABSTRACT

A system and methods for prioritizing and processing updated inventory information for event listings are described. In one embodiment, a network-based system may receive updated ticket information from a seller for multiple event listings, categorize the updated ticket information from the seller by event, prioritize event categories comprising updated ticket information in accordance with a prioritization policy, and process a prioritized event category comprising updated ticket information for a particular event listing out-of-order with respect to one or more other event categories comprising previously-received updated ticket information for other event listings. Other embodiments are described and claimed.

20 Claims, 3 Drawing Sheets

SYSTEM AND METHODS FOR PRIORITIZING AND PROCESSING UPDATED INVENTORY INFORMATION FOR EVENT LISTINGS

BACKGROUND

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics. For these reasons, sellers actively use the Internet to offer, sell and distribute a wide variety of goods to take advantage of the many benefits provided by the Internet and electronic commerce.

One example of a market for goods within the realm of electronic commerce is the secondary ticket market. The secondary ticket market encompasses all instances in which live event tickets trade after the original point of purchase. This market exists for several reasons. First, event tickets have an especially time-sensitive nature. Numerous tickets expire unused each year because there is no efficient mechanism to buy and/or sell secondary event tickets. When a ticket expires after an event has passed, it loses all of its intrinsic value. As a result, if the ticket holder cannot attend the event, the only way to realize value for a ticket is to sell it in the secondary market. For example, many venues, universities and/or sports franchises offer "season tickets" which are often packaged in bulk requiring a buyer to purchase several tickets at once. As a result, season ticket holders often possess a number of tickets for events that they cannot attend, and therefore desire to sell on the secondary market.

Additionally, event venues have only a fixed supply of seating. Therefore, the number of available tickets for a particular event is limited, which means that high-demand events can have significant volumes of secondary trading. Buyers, who would like to sit only in certain seat locations, further create a supply and demand imbalance. Particularly, each seat location in a venue is totally unique, which means there could be demand for a specific seat location that exceeds supply even when the venue is not sold out in the primary market, thereby favoring the secondary market. Moreover, while tickets for certain events (e.g., football games of a team in the same venue) may be similarly priced, the actual supply and demand for such events may be substantially different, thereby favoring the secondary market.

StubHub provides a network-based system which implements an online secondary ticket marketplace for buyers and sellers of tickets for live events such as sports, concerts, theater, and other entertainment events. The StubHub online secondary ticket marketplace enables legitimate, convenient, reliable, and secure transactions at fair market value and provides ticket fulfillment services, even for "sold out" events. Accordingly, the StubHub online secondary ticket marketplace provides benefits for fans who wish to buy, sell or otherwise transfer secondary tickets as well as for teams, artists, and venues.

SUMMARY

Various embodiments relate to a system and methods for prioritizing and processing updated inventory information for event listings. In one embodiment, a network-based system may receive updated ticket information from a seller for multiple event listings, categorize the updated ticket information from the seller by event, prioritize event categories comprising updated ticket information in accordance with a prioritization policy, and process a prioritized event category comprising updated ticket information for a particular event listing out-of-order with respect to one or more other event categories comprising previously-received updated ticket information for other event listings. Other embodiments are described and claimed.

BRIEF DESCRIPTION OF THE DRAWINGS

The foregoing aspects and many of the attendant advantages of various embodiments will become more readily appreciated and better understood by reference to the following detailed description and the accompanying drawings.

DETAILED DESCRIPTION

Various embodiments are described for prioritizing and processing updated inventory information for event listings provided by an online ticket marketplace implemented by a network-based system. Numerous specific details are set forth to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
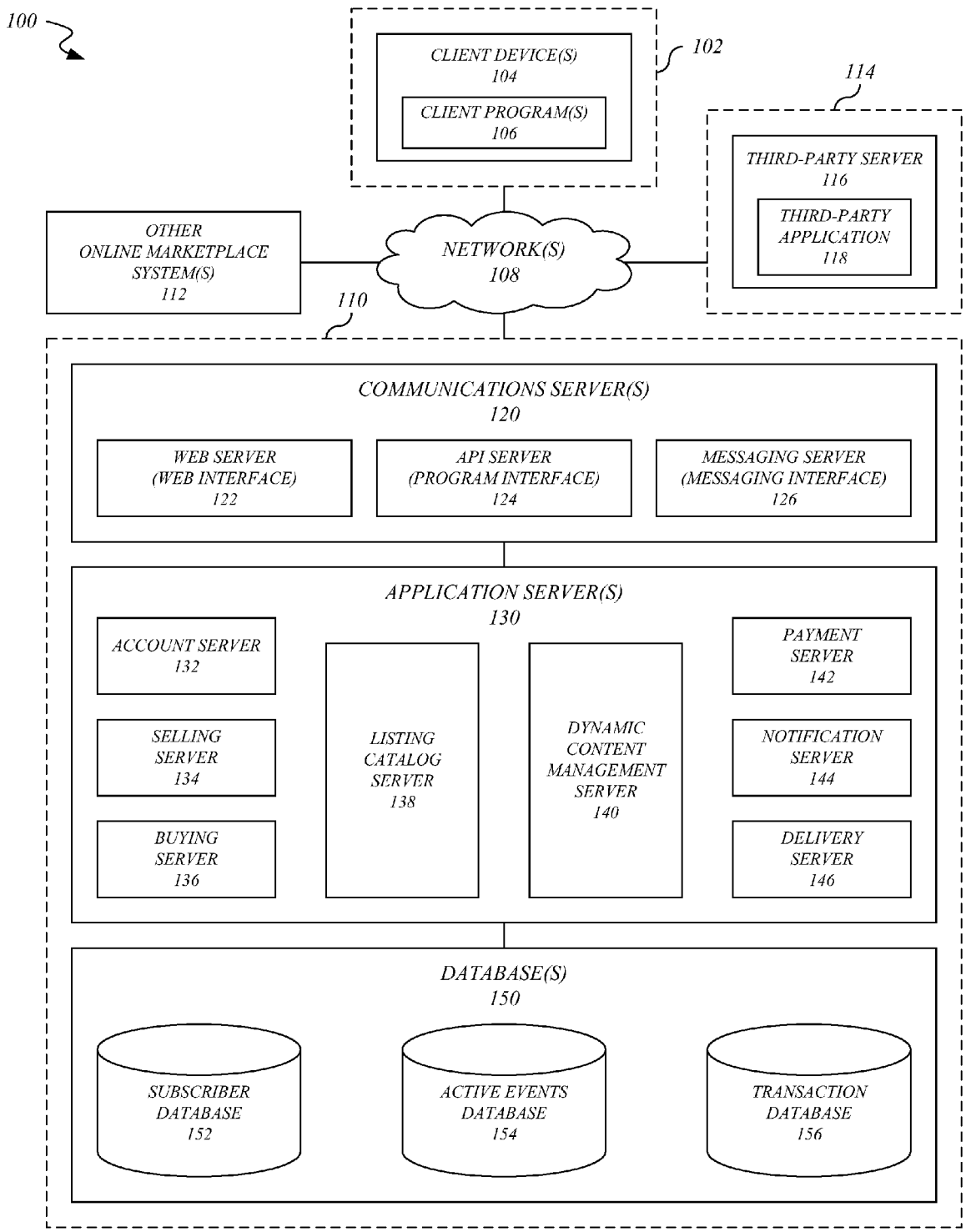
FIG. 1 illustrates an exemplary communications system including a network-based system for providing online marketplace and ticket fulfillment services in accordance with various embodiments.

FIG. 1 illustrates a communications system 100 suitable for implementing various embodiments. The elements of the communications system 100 generally may comprise physical or logical entities for communicating information and, in some cases, may be implemented as hardware, software, or combination thereof, as desired for a given set of design parameters or performance constraints. Although FIG. 1 includes a limited number of elements for purposes of illustration, it can be appreciated that the communications system 100 may include more or less elements as well as other types of elements.

Various elements of the communications system 100 may be implemented utilizing one or more computing devices having computing and/or communications capabilities in accordance with the described embodiments. Exemplary computing devices may include, without limitation, a mobile device, a personal digital assistant (PDA), a mobile computing device, a communications device, a telephone, a mobile telephone, a cellular telephone, a smart phone, a handset, a one-way pager, a two-way pager, a messaging device, a computer, a personal computer (PC), a desktop computer, a work station, a laptop computer, a notebook computer, a tablet computer, a handheld computer, a mini-computer, a network appliance, a web appliance, a server, a server computer, a server array, a server farm, an Internet server, a web server, a network server, a main frame computer, a supercomputer, a distributed computing system, multiprocessor system, processor-based systems, a control system, consumer electronic equipment, a media device, a gaming device, a television, a digital television, a set-top box (STB), wireless access point, base station, subscriber station, mobile subscriber center, radio network controller, a network access device, a telephone network device, a mobile telephone network device, a VoIP network device, a radio network device, a television network device, a satellite network device, a router, a hub, a gateway, a bridge, a switch, a machine, or combination thereof.

The computing devices utilized by the communications system 100 may be implemented by various hardware and/or software components in accordance with the described embodiments. Exemplary hardware components may include processing devices such as central processing unit (CPU) and/or other processors, microprocessors, application processors, radio processors, baseband processors, digital signal processors (DSP), circuits, circuit elements (e.g., transistors, resistors, capacitors, inductors, and so forth), integrated circuits, application specific integrated circuits (ASIC), programmable logic devices (PLD), a field programmable gate array (FPGA), logic gates, registers, semiconductor device, chips, microchips, chip sets, memory such as volatile and/or non-volatile memory, a display such as a liquid crystal display (LCD) or cathode ray tube (CRT), input devices such a keyboard, mouse, stylus, touch pad, and/or touch screen, networking devices such as ports, network interface cards (NICs), transmitters, receivers, transceivers, and/or antennas, as well as other components. Exemplary software components may include computer programs, applications, application programs, system programs, operating system (OS) software, middleware, firmware, a software interface, a programmatic interface, an application program interfaces (API), a network interface, a web interface, a messaging interface, modules, instruction sets, routines, subroutines, functions, calls, computing code, or combination thereof.

Various elements of the communications system 100 may support wired and/or wireless communications functionality in accordance with the described embodiments. For example, some computing devices may be arranged to communicate information over one or more types of communication links such as a wire, cable, bus, printed circuit board (PCB), backplane, switch fabric, semiconductor material, twisted-pair wire, co-axial cable, fiber optic connection, Ethernet connection, peer-to-peer (P2P) connection, a data channel, a radio channel, a satellite channel, a television channel, a broadcast channel, an infrared (IR) channel, a radio-frequency (RF) channel, a portion of the RF spectrum, one or more licensed or license-free frequency bands, and so forth.

Various elements of the communications system 100 may support communication over one or more types of networks in accordance with the described embodiments. For example, some computing devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. Computing devices and networks also may support wireless wide area network (WWAN) communications services including Internet access such as EV-DO, EV-DV, CDMA/1xRTT, GSM/GPRS, EDGE, HSDPA, HSUPA, and others.

Computing devices and networks may support wireless local area network (WLAN) and/or wireless metropolitan are network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. Computing devices and networks also may support short range communication such as a wireless personal area network (WPAN) communication, Bluetooth® data communication, infrared (IR) communication, near-field communication, electromagnetic induction (EMI) communication, passive or active RFID communication, micro-impulse radar (MIR), ultra-wide band (UWB) communication, automatic identification and data capture (AIDC) communication, and others.

Further aspects and advantages of various embodiments will become more readily appreciated and better understood by the following description of the elements of the communications system 100 illustrated in FIG. 1. Although certain exemplary embodiments and implementations may be illustrated and described as comprising a particular combination of elements and performing a particular set of operations, it is to be understood that the principles and techniques discussed herein are not limited to such examples.

In the embodiment shown in FIG. 1, the communications system 100 includes, among other elements, a client 102 which may comprise or employ one or more client devices 104 such as a mobile computing device, a PC, and/or any other computing device having computing and/or communications capabilities in accordance with the described embodiments. The client devices 104 generally may provide one or more client programs 106 such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. In some usage scenarios, one or more of the client programs 106 may display various graphical user interfaces (GUIs) to present information to and/or receive information from one or more of the client devices 104.

As shown, the client 102 is communicatively coupled via one or more networks 108 to a network-based system 110. The network-based system 110 may be structured, arranged, and/or configured to allow the client 102 to establish one or more communications sessions with the network-based system 110 using various computing devices 104 and/or client programs 106. Accordingly, a communications session between the client 102 and the network-based system 110 may involve the unidirectional and/or bidirectional exchange of information and may occur over one or more types of networks 108 depending on the mode of communication. While the embodiment of FIG. 1 illustrates the communications system 100 deployed in a client-server operating environment, it is to be understood that other suitable operating environments and/or architectures may be used in accordance with the described embodiments.

Data and/or voice communications between the client 102 and the network-based system 110 may be sent and received over one or more networks 108 such as the Internet, a WAN, a WWAN, a WLAN, a mobile telephone network, a landline telephone network, a VoIP network, as well as other suitable networks. For example, the client 102 may communicate with the network-based system 110 over the Internet or other suitable WAN by sending and or receiving information via interaction with a web site, e-mail, IM session, and/or video messaging session. The client 102 also may communicate with the network-based system 110 via a telephone call to a customer service agent and/or interactive voice response (IVR) system made over a mobile telephone network, a landline network, and/or a VoIP network. In wireless implementations, the client 102 may communicate with the network-based system 110 over the Internet via a WLAN or mobile telephone network that supports WWAN communications services. The client 102 also may communicate over a mobile telephone network via SMS and/or MMS messaging. It is to be appreciated that the embodiments are not limited in this regard.

In various usage scenarios, communication sessions and/or messaging between the client 102 and the network-based system 110 may involve multiple modes of communication and/or multiple networks. In some cases, for example, the client 102 may initiate communication with the network-based system 110 by interacting with a web site. In response, the network-based system 110 may communicate with the client 102 in a variety of ways such as via the web site, e-mail, IM, SMS, MMS, and/or a telephone call from a customer service agent and/or IVR system. The communication from the network-based system 110 may comprise a message (e.g., e-mail, IM, SMS, MMS) containing relevant static or dynamic content, an embedded hyperlinked URL for directing the client 102 to a web site, and/or a hyperlinked telephone number for allowing the client 102 to click and place a telephone call to an agent (e.g., customer service agent and/or IVR system) of the network-based system 110.

When communicating with the network-based system 110, the client 102 may employ one or more client devices 104 and/or client programs 106. In various implementations, the client devices 104 and/or client programs 106 may host or provide one or more interfaces for communicating with the network-based system 110. Exemplary interfaces may include a web interface, an API interface, a messaging interface, and/or other suitable communication interface in accordance with the described embodiments. The client programs 106 for communicating with the network-based system 110 may comprise, for example, pre-installed, authored, downloaded, and/or web-based computer programs.

The client programs 106 provided by one or more of the client devices 104 (e.g., mobile computing device and/or PC) may include a web client. The web client may comprise, for example, a desktop and/or mobile (e.g., WAP) web browser (e.g., Internet Explorer®, Mozilla®, Firefox®, Safari®, Opera®, Netscape Navigator®, etc.) capable of rendering web pages (e.g., HTML documents) and supporting various browser-based web technologies and programming languages such as HTML, XHTML, CSS, Document Object Model (DOM), XML, XSLT, XMLHttpRequestObject, JavaScript, ECMAScript, Jscript, Ajax, Flash®, Silverlight™, Visual Basic® (VB), VB Scripting Edition (VBScript), PHP, ASP, Java®, Shockwave®, Python, Perl®, C#/.net, and/or others.

In various usage scenarios, the client 102 may use a web client to provide an interface (e.g., HTTP interface) for navigating to a web site associated with the network-based system 110 and for requesting and receiving web page data from the network-based system 110. For example, the client 102 may use the web client to navigate to a web site associated with the network-based system 110 by entering a URL into a web browser address bar and/or by clicking on a hyperlinked URL delivered to the client 102 via a web page, web-based application, e-mail, IM, SMS, MMS, and/or other delivery mechanism.

In one or more embodiments, the web client may comprise or be implemented as a web browser toolbar for communicating with the network-based system 110. In such embodiments, the web browser toolbar may include, for example, a button (e.g., dedicated, customized, add-on) and/or a hyperlinked URL for navigating to a web site associated with the network-based system 110. The web browser toolbar also may implement enhanced features such as a search engine interface (e.g., text entry box, input fields, checkboxes, clickable hyperlinks) and/or one or more pull-down menus for accessing the network-based system 110, sending information (e.g., search query, keywords, user preferences, menu selections) to the network-based system 110, and/or receiving information (e.g., search results, relevant static or dynamic content) from the network-based system 110.

In one or more embodiments, the web client may comprise or be implemented as a widget such as a desktop or mobile widget for communicating with the network-based system 110. In such embodiments, the desktop or mobile widget may comprise web-based code, an interpreter, a virtual machine, and/or an API implementation to request, receive, present, and/or update content hosted by the network-based system 110. The desktop or mobile widget may comprise, for example, a client-side web application displayed on the desktop or phone-top of one or more of the client devices 104 implemented using various web technologies and programming languages. In various implementations, the desktop or mobile widget may be supported by a host runtime environment such as a web browser or suitable rendering engine and/or may be installed and run as a stand-alone application outside of a web browser.

In various embodiments, the network-based system 110 may provide users with one or more client-side web applications as described in co-pending U.S. patent application Ser. No. 12/275,783 titled "System and Methods for Providing Location-Based Upcoming Event Information Using a Client-Side Web Application Implemented on a Client Device," which was filed on Nov. 21, 2008 and is incorporated by reference in its entirety. In such embodiments, once downloaded and installed on a client device (e.g., PC or mobile device) of the user, the client-side web application may be configured to provide upcoming event information based upon the location of the user.

The client programs 106 executed by one or more of the client devices 104 may include a programmatic client for accessing and communicating with the network-based system 110. Along with performing a certain set of functions, the programmatic client may include, for example, an implementation of an API provided by the network-based system 110 for enabling access to and/or communication with various elements (e.g., servers, databases) of the network-based system 110. In various embodiments, the API implementation may comprise executable code in accordance with an SDK provided by the network-based system 110.

The client programs 106 executed by one or more of the client devices 104 (e.g., mobile computing device and/or PC) also may include a messaging client. The messaging client may comprise, for example, an application that supports one or more modes of communication such as e-mail, IM, SMS, MMS, telephone, VoIP, video messaging, and so forth. It can be appreciated that some messaging clients may required and/or launch an Internet connection in the background when executed.

In various embodiments, the communications system 100 includes, among other elements, one or more other online marketplace systems 112. The other online marketplace systems 112 may communicate with and enable the network-based system 110 to provide the client 102 with additional services and/or information such as additional ticket inventory. In various embodiments, access to the network-based system 110 may provide the user with the ability to receive aggregated content and/or online marketplace and ticket fulfillment services of the network-based system 110 and one or more other online marketplace systems 112 (eBay® services, Kijiji™ services, PayPal™ services, etc.). For example, the location-based upcoming event information may include event listings published by sellers via the online marketplace services of the network-based system 110 as well as event listings published by sellers via one or more of the other online marketplace systems 118 (e.g., eBay® online marketplace, Kijiji™ online marketplace).

As shown in FIG. 1, the communications system 100 includes a third party 114 which, in turn, may comprise or employ a third-party server 116 hosting a third-party application 118. While FIG. 1 shows only the third party 114 for purposes of illustration, it can be appreciated that the communication system 100 may comprise multiple different third-parties. The third-party server 116 and/or third-party application 118 may host a third-party web site associated with or employed by a third party 114 such as an affiliate, partner, or other third-party entity or user in accordance with the described embodiments. In some usage scenarios, one or more of the client programs 106 may be used to access the network-based system 110 after initially communicating with a third-party web site. For example, the web site of the third party 114 (e.g., affiliate, partner) may comprise a hyperlinked advertisement that, when clicked, directs to the web client to a web page hosted by network-based system 110. In some cases, the third party 114 may be directly or indirectly compensated for directing traffic from the third-party web site to the web site of the network-based system 110 and/or in the event that an electronic commerce transaction results after a user is directed from the third-party web sites to the web site of the network-based system 110.

In various embodiments, the network-based system 110 may provide online marketplace and ticket fulfillment services for sellers of tickets for live events such as sports, concerts, theater, and other entertainment events. In one or more of such embodiments, the third-party application 118 hosted by the third party 114 may promote, enhance, complement, supplement, and/or substitute for one more services provided by the network-based system 110. For example, the third party 114 may provide a server-side web application such as a web widget and/or an API implementation for accessing the network-based system 110 via the third-party application 118, a third-party web site, and/or a third-party web page as described in co-pending U.S. patent application Ser. No. 12/338,158 titled "System and Methods for Third-Party Access to a Network-Based System for Providing Location-Based Upcoming Event Information," which was filed on Dec. 18, 2008 and is incorporated by reference in its entirety.

When implemented by a client 102 and/or a third party 114, web applications may access and receive content and/or online services from the network-based system 110 and/or other online marketplace systems 112. The web applications may be implemented using various web technologies and programming languages (e.g., interpreted, compiled, scripting, virtual machine, etc.) and/or in accordance with a software development kit (SDK). For example, a web application may comprise web-based code configured for communication with the network-based system 110 and/or other online marketplace systems 112. In some implementations, the web application may be configured to present an aggregate of ticket inventory available from multiple online marketplaces including the network-based system 110 and one or more other online marketplace systems 112 and to provide the user with multiple purchasing options.

In various embodiments, the network-based system 110 may communicate with and provide online services to users such as buyers and sellers of goods. It is to be appreciated that goods for purchase and/or sale may include both tangible goods (e.g., physical tickets, electronic tickets), intangible goods (e.g., rights and/or licenses that are afforded by the tickets), and other goods in accordance with the described embodiments. It also is to be appreciated that users other than buyers and/or sellers may communicate with the network-based system 110. In some cases, for example, the client 102 may be associated with an administrator or customer service agent and may communicate with the network-based system 110 to monitor, update, and/or otherwise manage one or more computing devices and/or services of the network-based system 110.

In accordance with various embodiments, the network-based system 110 may communicate with a point-of-sale (POS) and/or inventory management system configured to manage inventory and/or communicate with the network-based system 110. The POS and/or inventory management system may be implemented, for example, by a client 102, other marketplace systems 112, third party 114, and/or other user. The POS and/or inventory management system may be implemented by one or more computer systems comprising computing devices such as PCs, servers, and/or other suitable devices and computer programs such as a stand-alone or web-based POS and/or inventory management application for managing a large volume of available inventory and communicating with the network-based system 110.

In some usage scenarios, the POS and/or inventory management system may be employed by a high-volume seller such as a ticket broker to author, update, and manage a large number of inventory listings. In other usage scenarios, the POS and/or inventory management may be employed by an agent of the network-based system 110 at a drop-off location that may handle the responsibility of accepting tickets from sellers, shipping the tickets to the buyer, delivering the tickets to the event venue will call, and/or the keeping the tickets until pick-up by the buyer. It can be appreciated that as tickets are sold, the actual available inventory associated with ticket listings may be extremely dynamic especially in cases where a seller (e.g., ticket broker) may sell inventory published by the network-based system 110 independently of the network-based system 110. For example, a ticket broker may sell tickets directly to customers and also may use the network-based system 110 as one of several other channels to sell tickets.

The POS and/or inventory management system may be configured to perform batch-mode communication with the network-based system 110 to provide updated inventory information for event listings. The batch-mode communication from may comprise inventory data for numerous inventory items (e.g., hundreds, thousands) for publication by the network-based system 110. Accordingly, such batch-mode communication allows high-volume sellers to update inventory to be published by the network-based system 110 without having to individually enter items for sale on a ticket-by-ticket basis.

In some usage scenarios, a batch of inventory information communicated from a ticket broker to the network-based system 110 may comprise a full file job listing of all inventory of the ticket broker at a particular point in time. In other usage scenarios, a batch of inventory information communicated from a ticket broker to the network-based system 110 may comprise a delta job listing changes to inventory information previously sent or uploaded by the ticket broker to the network-based system 110. In some cases, a batch of inventory communicated by a ticket broker may comprise a consolidation of listings from multiple ticket brokers. The consolidation of listings (consolidator job), in turn, may include full file jobs and/or delta jobs for multiple ticket brokers.

In some implementations, the network-based system 110 may communicate with and receive updated inventory information for ticket listings from one or more POS and/or inventory management systems in real time. In such implementations, the POS and/or inventory management system may be configured to provide real-time inventory updates so that the event listings published by network-based system 110 are synchronized with and accurately reflect the available inventory for sale of a high-volume seller (e.g., ticket broker).

In other implementations, the network-based system 110 may communicate with and receive updated inventory information for ticket listings from one or more POS and/or inventory management systems that may not have real-time updating functionality. In such implementations, high-volume sellers (e.g., ticket brokers) want updated inventory information communicated to the network-based system 110 to be published as quickly as possible in order to maximize the opportunity for selling especially during critical time periods associated with an event. For example, the days including and/or immediately following the on-sale date for tickets to an event are time periods of high activity for buying and selling. The days immediately preceding and/or including the event date also are time periods of high activity for buying and selling. The time period between such high-activity time period generally is a time of lower activity for ticket sales and, in some cases, may be considered less critical. It can be appreciated that after an event date has passed, tickets for the event will have no value.

In accordance with various embodiments, the network based system 110 may be configured to prioritize and process updated inventory information for event listings. In such embodiments, the network-based system 110 may be arranged to receive updated inventory information and to process workloads comprising updated inventory information efficiently, intelligently, fairly, and accurately to ensure that the listings published by the network-based system 110 reflect updated inventory available for sale especially during critical time periods associated with an event. Further details of such embodiments are described below with reference to FIGS. 2 and 3.

FIG. 1 illustrates an exemplary embodiment of the network-based system 110 for providing online ticket marketplace. As shown, the network-based system 110 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers.

In various implementations, the servers of the network-based system 110 may comprise or implement software components deployed in a tiered environment, where one or more servers are used to host server software running in each tier. For example, using a three-tiered architecture, one or more server software components may be hosted by front-end servers, one more server software components may be hosted by a middle tier or middleware implemented by application servers, and one more server software components may be hosted by a back-end tier implemented by databases and/or file systems. In some embodiments, servers of the network-based system 110 may be communicatively coupled with each other via a local area network (LAN) and/or suitable intranet or back-end network.

The network-based system 110 may comprise one or more communications servers 120 for providing suitable interfaces to enable communication using various modes of communication and/or via one or more networks 108. In the embodiment of FIG. 1, the communications servers 120 include a web server 122, an API server 124, and a messaging server 126 to provide interfaces to one or more application servers 130. The application servers 130 of the network-based system 110 may be structured, arranged, and/or configured to provide various online marketplace and/or ticket fulfillment services to users that access the network-based system 110.

In various usage scenarios, the client 102 may communicate with the applications servers 130 of the network-based system 110 via one or more of a web interface provided by the web server 122, a programmatic interface provided by the API server 124, and a messaging interface provided by the messaging server 126. It can be appreciated that the web server 122, the API server 124, and the messaging server 126 may be structured, arranged, and/or configured to communicate with various types of client devices 104 and/or client programs 106 and may interoperate with each other in some implementations.

The web server 122 may be arranged to host web pages (e.g., HTML documents) and provide an appropriate web interface (e.g., HTTP, CGI, etc.) for enabling data to be presented to and received from entities via the Internet. The web server 122 may be arranged to communicate with web clients and/or applications such as a web browser, web browser toolbar, desktop widget, mobile widget, web-based application, web-based interpreter, virtual machine, and so forth. The web server 122 may provide a web interface to enable access by the client 102 and/or the third party 114 to the various services and functions provided by the application servers 130. For example, the web server 122 may be arranged to receive data from the client 102 and/or third party 114 and to pass the data to one or more application servers 130 within the network-based system 110. The web sever 122 also may present the client 102 and/or third party 114 with relevant static and dynamic content hosted by the network-based system 110 in response to various requests and/or events.

The API server 124 may be arranged to communicate with various client programs 106 and/or a third-party application 118 (e.g., third-party web site) comprising an implementation of API for the network-based system 110. The API server 124 may provide a programmatic interface to enable access by the client 102 and/or the third party 114 to the various services and functions provided by the application servers 130. For example, the programmatic interface provided by the API server 124 may be used for batch-mode and/or real-time communication with a high-volume seller for receiving and updating inventory listings. The programmatic interface provided by the API server 124 also may be used to communicate relevant static or dynamic content hosted by the network-based system 110 to an API implementation of one or more client programs 106 and/or a third-party application 118 (e.g., third-party web site). The API implementation may comprise, for example, executable code in accordance with a SDK provided by the network-based system 110.

The messaging server 126 may be arranged to communicate with various messaging clients and/or applications such as e-mail, IM, SMS, MMS, telephone, VoIP, video messaging, and so forth. The messaging server 126 may provide a messaging interface to enable access by the client 102 and/or the third party 114 to the various services and functions provided by the application servers 130. For example, the messaging interface provided by the messaging server 126 may be used to communicate with the client 102 and/or the third party 114 in a variety of ways such as via e-mail, IM, SMS, MMS, video messaging, and/or a telephone call (e.g., landline, mobile, VoIP) with a customer service agent and/or IVR system.

When implemented as an online ticket marketplace, the application servers 130 of the network-based system 110 may provide various online marketplace and ticket fulfillment services including, for example, account services, buying services, selling services, listing catalog services, dynamic content management services, delivery services, payment services, notification services, and other services in accordance with the described embodiments. In the exemplary implementation shown in FIG. 1, the application servers 130 may comprise an account server 132, a selling server 134, a buying server 136, a listing catalog server 138, a dynamic content management server 140, a payment server 142, a notification server 144, and a delivery server 146 structured and arranged to provide such online marketplace and ticket fulfillment services.

The application servers 130, in turn, may be coupled to and capable of accessing one or more databases 150 including a subscriber database 152, an active events database 154, and a transaction database 156. The databases 150 generally may store and maintain various types of information for use by the application servers 130 and may comprise or be implemented by various types of computer storage devices (e.g., servers, memory) and/or database structures (e.g., relational, object-oriented, hierarchical, dimensional, network) in accordance with the described embodiments.

Account Services

The account server 132 implemented by one or more of the application servers 130 may allow a user to establish and/or manage a subscriber account with the network-based system 110. For example, while some services provided by the network-based system 110 may be generally accessible, a user may be required to access an existing subscriber account or register a new subscriber account with the network-based system 110 in order to receive certain customized and/or subscriber-specific services.

To create a subscriber account, a user may provide the network-based system 110 with account information such as a unique username, e-mail address, password, name, location (e.g., address, city, country, and/or zip code), telephone numbers (e.g., home, work, and/or mobile), and/or other required information for identifying and/or authenticating the user. After receiving the required account information and instructions from the user to create the subscriber account, the network-based system 110 may create the subscriber account and store the account information in the subscriber database 152.

After a subscriber account is created, the user may view and/or make changes to account information, add or edit existing contacts, retrieve or change the password, view and edit sources of funds and/or financial value on file, view and edit payment options, and/or otherwise manage the subscriber account.

To effectuate the buying or selling of goods such as event tickets, the user may be required to link the subscriber account of to a source of funds and/or financial value for completing different transactions via the network-based system 110. It can be appreciated that the user may provide various types of entities or third-party financial accounts capable of supplying or receiving funds and/or financial value in accordance with the described embodiments. Exemplary entities and/or third-party financial accounts may include, without limitation, a bank, bank account, lender, line-of-credit, credit card company, credit card account, debit card, prepaid debit card account, third-party payment services account (e.g., PayPal™ account), payroll account, check, money order, or any other suitable source of financial value.

Additionally or alternatively to linking the subscriber account to a source of financial value based on a commercial currency (e.g., U.S. dollar), a user may link to the subscriber account to a source of financial value based on a proprietary and/or promotional currency (e.g., points, rewards, coupons) capable of accumulation and/or redemption by the user to pay for goods or services. It can be appreciated that multiple sources of funds and/or financial value associated with the user may be linked to the subscriber account enabling the user to select among such sources to effectuate different payment transactions via the network-based system 110.

The user may select various options for receiving payment when a sale is effectuated via the network-based system 110. For example, the user may request payment for sales via check, deposit to a third-party payment services account (e.g., PayPal™ account) or Season Ticket Account, and/or other type of source capable of receiving funds and/or financial value in accordance with the described embodiments. In some implementations, the user may select to donate some or all of the proceeds of a sale to a third-party such as a non-profit organization or entity (e.g., charity, foundation, fund, alliance, society) as described in co-pending U.S. patent application Ser. No. 10/697,850 titled "System and Method for Providing Logistics for a Sale or Transfer of Goods with Proceeds Provided to a Third Party," which was filed on Oct. 30, 2003 and is incorporated by reference in its entirety.

When accessing the subscriber account, the user may view and/or manage various details of past and pending transactions. For example, the subscriber account may provide a seller with details regarding past and pending ticket sale listings (e.g., shipped, canceled, inactive, expired, deleted, active, pending confirmation, awaiting shipment) and may allow the user to track event listings, modify the prices of event listings, view and confirm received orders, view and confirm orders to ship, print or reprint shipping labels, view shipped orders, view canceled orders, view the status of payments and edit payment options, view past payments, and so forth.

In accordance with various embodiments, a high-volume seller (e.g., ticket broker) may be presented with an interface comprising a set of screens for viewing uploaded ticket inventory and/or for manipulating inventory information (e.g., ticket details). In such embodiments, the high-volume seller may access and view the subscriber account using a web browser and/or POS and/or inventory management application. In some cases, the seller may view and/or filter uploaded inventory by genre, event, or other ticket criteria.

The subscriber account also may provide a buyer with details regarding past and pending ticket purchase transactions (e.g., past orders, purchased, delivered, canceled, expired, order status, delivery status, active bids, auctions lost) and may allow the user to view order history, track active bids, modify offers, download and print electronic tickets, view and edit payment options, and so forth.

The user may customize a subscriber account with one or more interests and ticketing preferences. For example, a user may add and edit information associated with a subscriber account regarding one or more cities, venues, artists, teams and sporting events, theaters, and season ticket and packages of interest to the user. In some cases, buyers may request to receive promotions via an e-mail newsletter featuring events happening in a particular location.

Users also may customize subscriber accounts with one or more notification preferences. For example, a user may configure a subscriber account to receive notifications, change notifications, and/or discontinue notifications. Users may subscribe to receive customized notifications in a variety of ways such as via e-mail, IM, SMS, MMS, and/or other suitable delivery mechanism. In addition to receiving such notifications via e-mail, IM, SMS, MMS, a user may access the subscriber account and view recent notifications such as alert notifications and other messages received in the past week.

In accordance with various embodiments, a seller such as a high-volume seller (e.g., ticket broker) may automatically receive one or more notifications when updated inventory information communicated to the network-based system 110 is received, published, and/or changed. For example, the stages involved in receiving, prioritizing, and processing updated inventory information may be monitored by the network-based system 110, and notifications may be provided to the subscriber account and/or a computing device of the seller to confirm receipt and processing of the updated inventory information and/or to alert the seller in the event that a failure condition is encountered at any stage.

In various implementations, a subscriber account may be provided and/or associated with a priority level or grade. For example, the network-based system 110 may provide and/or associate a priority level (e.g., platinum, gold, silver, etc.) with an account according to criteria such as number of listings, volume of sales, commission generated, comments (e.g., positive or negative feedback), and so forth. In some cases, subscribers may be promoted or demoted to different priority levels according to a scheme that attributes points based on activity. In one or more of such implementations, a subscriber may alternatively or additionally pay a premium (e.g., fixed fee, additional commission percentage) to obtain a particular priority level. In accordance with the described embodiments, the priority level or grade associated with a high-volume seller (e.g., ticket broker) may be used by the network-based system 110 for prioritizing and/or processing updated inventory information for event listings.

Selling Services

The selling server 134 implemented by one or more of the application servers 130 may allow a user to offer goods for sale via an online marketplace provided by the network-based system 110. To list goods for sale such as a single or multiple event tickets, a seller may provide the network-based system 110 with required event information such as event, location of the tickets, sale type, ticket quantity, seating details (e.g., section, row, seat, comments), price, and payment method. After receiving the required event information and instructions from the seller to publish an event listing, the network-based system 110 may create an active event and store the event information in the active events database 154 for publication to users of the network-based system 110. It can be appreciated that upon the sale of the tickets, one or more delivery options may be available depending on the locations of the buyer and the seller, the time remaining before the event, and/or the form of the tickets (e.g., physical tickets, electronic tickets).

In various embodiments, a seller may post an event for publication as described in co-pending U.S. patent application Ser. No. 11/689,787 titled "System and Method for Posting Multiple Items for Sale," which was filed on Mar. 22, 2007 and is incorporated by reference in its entirety. In such embodiments, the seller may select the appropriate type of event, city, or venue for event tickets being offered for sale, and then may be queried or prompted to select a specific event after making selections from various categories and subcategories presented via a set of interactive pull-down menus.

In one implementation, for example, a seller may be presented with a pull-down menu listing categories such as sports tickets, concert tickets, theater and arts tickets, and ticket gift certificates. If the seller selects the sports tickets category, a pull-down menu listing sports tickets such as baseball tickets, basketball tickets, football tickets, and other types of sports tickets is presented. If the seller then selects football tickets, a pull-down menu listing sports subcategories such as NFL tickets, CFL tickets, and NCAA tickets is presented. If the seller selects the NFL tickets, a pull-down menu listing ticket subcategories such as NFL regular season tickets, NFL playoff tickets, and NFL pro bowl tickets is presented. If the seller selects the NFL regular season tickets, a pull-down menu listing NFL teams is presented. Once the seller selects tickets for particular NFL team, a listing of available events including event details (e.g., team and opponent, date, time, venue name) for the team are displayed which can be sorted by event, date, and venue. The seller may then select an event from the listing of available events. It can be appreciated that appropriate sets of pull-down menus for listing categories and successive subcategories may be presented for any type of event ticket in accordance with the described embodiments.

After an event has been selected, the seller may provide the network-based system 110 with the shipping location of the tickets and verify current contact information (e.g., address and telephone phone number). The seller may provide a sale type such as a fixed price sale (e.g., set price capable of subsequent modification), a declining price sale (e.g., automatically decreasing price over time from maximum price to minimum), or an auction sale (e.g., buyers bid from a starting price during an open period with the highest bidder placing an order when the auction closes).

The seller may provide the ticket quantity for specific seats or general admission. The seller may provide the ticket quantity and may allow the quantity of offered tickets to be split among several buyers in multiples of two. The seller may provide seating and ticket details for the offered tickets such as section, row, seat numbers, and may provide other comments. In some cases, the seller may select to prevent buyers from viewing the specific seat numbers when the event listing is published by the network-based system 110.

The seller may provide the price per ticket and the ending date of the sale when the event listing is to be removed from publication. For some events, the event listing may expire three business days before the event. In certain markets, tickets may be sold on consignment and the listing may remain until the start of the event.

The seller may provide a selected payment method for the sale of the tickets such as via check, deposit to a third-party payment services account (e.g., PayPal™ account), Season Ticket Account, and/or other type of source capable of receiving funds and/or financial value, and/or donation to a third-party such as a non-profit organization or entity.

In various implementations, the seller may support the delivery of electronic tickets to a buyer. In such implementations, the seller may associate a listing for an event with one or more of a media file (e.g., PDF file), a uniform resource identifier (URI) referencing a media file, and/or a bar code.

Listing Manager Services

In accordance with various embodiments, the network-based system 110 may provide listing manager services for receiving, prioritizing, and processing updated inventory information (e.g., files including batches of inventory items exported by inventory management systems). For example, the network-based system 110 may comprise a listing manager system implemented by one or more of the communications servers 120, application servers 130, and/or databases 150 of the network-based system 110. In one or more implementations, the selling services provided by the network-based system 110 may include and/or involve listing manager services for receiving, prioritizing, and processing updated inventory information. In such implementations, the selling server 134 may comprise a listing manager system for providing such services.

It can be appreciated that while FIG. 1 shows only one selling server 134 for purposes of illustration, the selling server 134 may comprise multiple computing and/or storage devices (e.g., servers, memory, databases) which, in turn, may implement a listing manager system for performing operations in accordance with the described embodiments. It also can be appreciated that the listing manager system may comprise, may be implemented by, and/or may cooperate with other computing and/or storage devices (e.g., communications servers 120, application servers 130, databases 150) of the network-based system 110.

In various embodiments, the listing manager implemented by the network-based system 110 may be configured to receive updated ticket information from a seller for multiple event listings, categorize the updated ticket information from the seller by event, prioritize event categories comprising updated ticket information in accordance with a prioritization policy, and process a prioritized event category comprising updated ticket information for a particular event listing out-of-order with respect to one or more other event categories comprising previously-received updated ticket information for other event listings. The prioritization policy may ensure that multiple updates for a specific event listing are processed in order according to time received by the network-based system 110. Further details of an exemplary listing manager system are described below with reference to FIGS. 2 and 3.

Buying Services

The buying server 136 implemented by one or more of the application servers 130 may allow a user to locate goods offered for sale via an online marketplace provided by the network-based system 110. To find goods for sale such as a single or multiple event tickets, a buyer may view active event listing published by the network-based system 110.

In accordance with various embodiments, information may be presented to and/or received from information from the user via one or more user interfaces presented on the display of a client device (e.g., PC or mobile device). The user interfaces presented to the user by a client-side web application may comprise a search engine interface (e.g., text entry boxes, input fields, checkboxes, clickable hyperlinks, pull-down menus, etc.) for allowing the user to provide event criteria for searching and/or filtering event listings. The user interfaces presented to the user also may comprise search results including upcoming event listings that satisfy the event criteria.

For example, the buyer may browse active event listings by clicking and following links for various event categories and subcategories such as sports tickets, concert tickets, theater tickets, cities, sports, teams, artists, show type (e.g., Broadway, opera, ballet, comedy), event names, and so forth. The buyer also may search for events using a search engine interface and/or one or more pull-down menus. For example, the buyer may enter one or more keywords into a search engine text entry box and view results comprising active events that satisfy the query. In various implementations, the buyer may be presented with a ticket finder screen comprising a plurality of pull-down menus for allowing the buyer to quickly formulate a search by selecting a category (e.g., sports, concert, theater, etc.), a location (e.g., city), and a number of tickets from the pull-down menus.

In some embodiments, a user may search for and/or request upcoming event information based on a variety of event criteria such as an event name, category, city, venue, artist, genre, team, player (e.g., starting pitcher, favorite player), theater, date range, date, number of tickets, price range, ticket attributes (e.g., zone range, zone, section range, section, row range, row, seat number range, seat number), and/or combination thereof. Accordingly, the event criteria included in a search query may comprise ticket attributes as well as one or more conditions associated with the event parameters for requesting information for such upcoming events only when such conditions are met.

Various combinations of event criteria are possible in accordance with the described embodiments. For example, a user may request upcoming event information specifying combinations such as a certain number of tickets and a maximum price, a particular artist and a certain city, a certain player and a particular event venue, and so forth. A user also may request upcoming event information based on one or more ticket attributes. For instance, a user may request a certain number of tickets for an upcoming event in one or more specified zones, sections, rows, and/or or seats. Additionally, event criteria may be applied alone or in combination across one or more events. A user may request, for example, tickets in a certain row (e.g., front row) or row range (e.g., rows 1-5) within a specified zone (e.g., club infield) or section (e.g., section 224) for a designated team (e.g., professional baseball team) and/or for one or more games (e.g., particular opponent, rivalry game). The embodiments are not limited in the regard.

It can be appreciated that in some cases, an upcoming event may not satisfy all event criteria specified by the user. For example, tickets for an upcoming event may be available but not within a price range specified by the user. Additionally, there may be no upcoming events that satisfy the event criteria specified by the user when there are no available tickets such as when no sellers have listed tickets for an event and/or before tickets for an event go on sale. In such cases, the client-side web application may inform the user that there are no search results satisfying the search criteria and then perform a new search with relaxed search criteria. Alternatively or additionally, the client-side web application may automatically relax the search criteria and attempt another search.

Once a buyer has located and selected an event, the tickets being offered for sale for the event may be presented to the buyer. In various embodiments, the user may view the details of tickets being offered for sale and the location of tickets in the event venue as described in co-pending U.S. patent application Ser. No. 11/552,782 titled "Method and System for Illustrating Where a Ticket is Located in an Event Venue," which was filed on Oct. 25, 2006 and is incorporated by reference in its entirety. In such embodiments, the buyer may be presented with an interactive event venue seat map and details of available tickets according to criteria specified by the buyer.

In one implementation, for example, after selecting an event the buyer may be presented with an interactive event venue seat map and an initial listing of all event tickets for sale. The event listings may include details such as section, row, quantity, and price and may be sorted by the buyer according to such details. The sections of the interactive event venue seat map for which tickets are available may be displayed in color while sections having no available tickets may be displayed in white.

Within the interactive event venue seat map, comparable or similarly-located (e.g., upper level) sections having available tickets may be displayed in the same color while sections having available tickets that are not comparable or similarly-located may be displayed in different colors. For example, the colors used in the sections may correspond to zones for the sections with each zone comprising several comparable or similarly-located sections. Along with the interactive event venue seat map, the buyer may be presented list comprising the different zone names and the color used for each zone. The names of zones having available tickets may be displayed in black text, while the names of zones having no available tickets may be displayed in gray text.

When presented with the interactive event venue seat map, the buyer may roll over a particular section causing a roll-over screen to appear indicating the quantity and price range of tickets available in that section. By clicking on a particular section, the event listings may be filtered to display only the event listings in the selected section along with the specific details (e.g., section, row, quantity, price) for such tickets. The buyer also may zoom-in, zoom-out, drag, and/or rotate the interactive event venue seat map.

When presented with the initial listing of all event tickets for sale, the buyer may filter the initial listing by inputting criteria such as one or more price ranges (e.g., $75-$286, $286-$349, $349-$442, $442-$559, and $559 and up). Once the buyer selects a price range, the event listings are filtered to display only the event listings in the selected price range. Additionally, the interactive event venue seat map is modified to display sections in color for which tickets are available in the selected price range.

Each event listing may include ticket attributes such as section, row, quantity, and price. Each listing also may include a link to view additional details that when clicked may display the ticket attributes along with further ticket details (e.g., seat numbers, time remaining to purchase the tickets, seller comments, delivery options), a selectively enlargeable image of the event venue for reviewing the location of the seats, and an action button for initiating purchase of the tickets.

To place an order for the tickets, the buyer may provide a delivery location, select a method of payment (e.g., credit card), confirm the transaction details (e.g., description of the tickets, delivery method, delivery location, payment amount, and method of payment), and the complete the purchase. When the buyer places the order, a confirmation e-mail is sent to the buyer, and the seller is notified of the order request via e-mail and requested to confirm the availability and delivery of the tickets. Upon receiving confirmation from the seller that the tickets have been sent, the buyer is notified as to when delivery can be expected. It can be appreciated that upon the sale of the tickets, one or more delivery options may be available depending on the locations of the buyer and the seller, the time remaining before the event, and/or the form of the tickets (e.g., physical tickets, electronic tickets).

Listing Catalog Services

The listing catalog server 138 implemented by one or more of the application servers 130 may be arranged to receive and respond to queries and/or to provide access to event information stored in the active events database 154. A query to the listing catalog server 138 may comprise, for example, a search query, web query, web feed request (e.g., RSS feed request, ATOM feed request), API request, HTTP request (e.g., Get, Post, etc.), a web form submission (e.g., XHTML/HTML form), and/or suitable request mechanism in accordance with the described embodiments. In various implementations, a query may be submitted to the listing catalog server 138 via one or more communications servers 120 from one or more client devices 104, client programs 106, a third-party server 116, and/or a third-party application 118. Queries also may be submitted to the listing catalog server 138 internally from other application severs 130 of the network-based system 110.

In one embodiment, the listing catalog server 138 may be implemented by a distributed architecture comprising a plurality of distributed indexing modules. Each of the distributed indexing modules may provide an interface for receiving queries from front-end servers such as the communications servers 120. The distributed indexing modules may store and build updatable indexes against which a query can be checked to expedite retrieval of a query result. The indexes may comprise, for example, common keywords or search terms and event IDs linked to such keywords or search terms. The distributed indexing modules also may cache common query results.

The distributed indexing modules may be arranged to receive updated indexing information brokered via a message bus from a local gatherer module. The local gatherer, in turn, may be coupled to and collect indexing information from the active events database 154. The indexing modules may update and/or filter the indexes based on the updated information received from the local gatherer module and/or information from other indexing modules.

The local gatherer module may be arranged to periodically scan items stored in the active events database 154 and obtain updated indexing information. For example, the local gatherer module may request items from the active events database 154 that have changed within a given time period. The event information stored in the active events database 154 may change frequently as new event listings for upcoming events are added and then removed when the tickets for such event listings are purchased. Furthermore, the active events database 154 may store relatively static information for an event such as category (e.g., sports, concerts, theater), as well as real-time dynamic information such as current event listings and true levels of ticket inventory. It can be appreciated that the event information maintained by the active events database 154 may be extremely dynamic especially in cases where LMS and electronic ticketing services are provided by the network-based system 110.

The listing catalog server 138 may receive and respond to the queries with event information for upcoming events that satisfy such queries. The event information may be provided locally from the listing catalog server 138, if available (e.g., cached), and/or may be retrieved by the listing catalog server 138 from the active events database 154. In various implementations, event information from the listing catalog server 138 may be communicated via one or more communications servers 120 to one or more client devices 104, client programs 106, a third-party server 116, and/or a third-party application 118. The event information from the listing catalog server 138 also may be provided internally to other application severs 130 of the network-based system 110.

In accordance with various embodiments, the listing catalog server 138 provides detailed ticket listing and event data, as well as information (e.g., metadata) about the classifications of that data. An event may be, for example, a sports, concerts, theater, or exclusives event, for which sellers are permitted to post tickets for sale. Genre is a category classification for classifying one or more events. Each event may be directly associated with one or more detailed-level genres. For example, an event or game of a particular team may be directly associated with a team tickets genre. That team tickets genre, in turn, may be classified under a more generic sport (e.g., baseball) genre. Geography (geo) is another category classification defining the location of an event. Category classification data may comprise, for example, search dimension data and/or metadata.

A ticket listing is a batch of individual tickets that sellers may post for sale via the network-based system 110. Ticket listings are associated with specific events and may have different restrictions such as the sale method (e.g. auction, fixed price, etc.) or whether the seller permits selling the constituent tickets in multiple batches or only as a single batch (e.g. ticket listing 'splits' may or may not be allowed). Ticket listings also contain information about the general type of seat within a specific venue (e.g., row, section, seats). Ticket listings also include the single price that each ticket within the listing is to be sold per the preference of the seller.

The data may be organized and/or stored by the listing catalog server 138 and/or stored in the active events database 154 within index documents. Exemplary types of index document include genre, geography, event, ticket, and others (e.g., venue, co-brand, logistics condition). Each unique index document instance may refer, for example, to a unique occurrence of a genre, geo, event, or ticket data set. Within each index document are fields which provide names and values of searchable attributes (e.g., price field) which allow searching for document instances (e.g., the value of the price field within a certain range).

Exemplary information parameters that may be included in various types of index document are described below in the following tables. It can be appreciated that the tables represent exemplary index document types and that other document types may be used in some implementations. It also can be appreciated that the index documents may include different event information parameters, additional event information parameters, or fewer information parameters than those described in the tables.

Exemplary information parameters that may be included in a genre index document are described below in the following table.

| Genre Index Document Fields Table | |
|---|---|
| Genre Document Field | Details |
| Active | indicates an active genre classification |
| ancestorDescriptions | shows an ordered list of space-separated parent genre names; from the most general to the most specific category level. A search for a match on any subset returns this query as a descendant. |
| ancestorGenreIds | shows an ordered list of parent genre unique ids; from the most general to the most specific category level. A search for a match on any subset returns this query as a descendant. |
| ancestorKeywords | shows comma-separated list of related keywords to ancestors of this genre. A search for a match on any subset of these keywords retrieves this descendant genre in its result set. |
| categorySearchKeywords | shows space-separated list of related keywords to this genre. A search for a match on any subset of these keywords retrieves this genre in its result set. |
| channel | shows general root category of site navigational flow to this sub-category. This usually corresponds to a browser tab label on the website (e.g. Sports, Concerts, Theater, Exclusives) |
| channelid | unique numeric id of genre document corresponding to channel field item |
| channelUrlPath | url string segment that site rewrites when navigating to this event genre category to make the HTTP Request URL more user-friendly than using id numbers. |
| dateLastIndexed | shows the date when this document was last added or updated into the document index to be searchable. This date time may be later than when the data was updated in the underlying base database. |
| deleted | indicates whether this genre has since been deleted and should no longer be used for sellers to post new ticket listings. |
| description | general description of genre |
| genreId | unique identifier for genre document |
| genre_parent_name | string corresponding to this genre's parent description |
| hidden | This indicates that an Active Genre can be used for creating new Events; but that this Genre will not be displayed on the site. |
| leaf | Is true if this genre is the most detailed category in its classification tree. False if it is the parent of more detailed genre categories |
| parent_id | the integer parent genre id of this genre. This is used to map the parent-child relationships among genres. |
| season_ticket_flag | This indicates whether this genre is being used as a time-search-dimension for a particular event season. |
| DocumentId | unique Id of indexed document as qualified by the Document Type |
| DocumentType | document type (e.g., genre) for results |
| urlpath | url string segment that site rewrites when navigating to this event genre category to make the HTTP Request URL more user-friendly than using id numbers. Corresponds to the current genre. |

Exemplary information parameters that may be included in a geography index document are described below in the following table.

| Geography Index Document Fields Table | |
|---|---|
| Geography Document Field | Details |
| Active | indicates an active geo classification |
| dateLastIndexed | shows the date when this document was last added or updated into the document index to be searchable. This date time may be later than when the data was updated in the underlying base database. |
| deleted | indicates whether this genre has since been deleted and should no longer be used for sellers to post new ticket listings. |
| description | general description of this geography |
| geoId | unique numeric identifier for this geography document instance |
| hidden | This indicates that an event can be created for an active Geo; but that this Geo will not be displayed on the site. |
| parent_id | Unique number for parent geography id for this geography. This is used to map the parent-child relationships among geographies. |
| season_ticket_flag | This indicates whether this geo is being used as a time-search-dimension for a particular event season. |
| DocumentType | document type (e.g., geography) for results |

Exemplary information parameters that may be included in an event index document are described below in the following table.

| Event Index Document Fields Table | |
|---|---|
| Event Document Field | Details |
| act_primary | Home Team Mascot |
| act_secondary | Away Team Mascot |
| date_inhand | Date on which the primary vendor starts selling tickets for the event |
| date_confirm | Date on which the seller must confirm |
| date_on_sale | Date on which the ticket can be sold |
| date_last_modified | Time of last change to the event |
| active | 1 = active event<br>0 = inactive event |
| allowedtoConform | 1 = seller allowed to confirm<br>0 = seller not allowed to confirm |
| allowedtosell | 1 = general public allowed to sell tickets<br>0 = generatl public not allowed to sell tickets |
| genre_parent | ID of the parent genre of the event |
| genre_grand_parent_id | genreId of the parent genre of the immediate genre_parent of this event |
| genre_grand_parent_name | name of the parent genre of the immediate genre_parent of this event |
| ancestorGenreIds | List of parent IDs, in order of hierarchy, identifying browsing path to reach the node |
| channelId | ID of the top level genre in the breadcrumb trail tied to the event |
| geography_parent | ID of the parent geo of the venue |
| ancestorGeoIds | List of geography IDs, in order of hierarchy, identifying browsing path to reach the geography node |
| event_date | Date and time of the event (GMT) |
| event_date_local | yyyy-mm-dd of the event |
| event_date_time | Date and local time of the event |
| hide_event_date | 1 = event date hidden<br>0 = event date not hidden |
| is_eticket_allowed | 1 = e-tickets allowed<br>0 = e-tickets not allowed |

| Event Index Document Fields Table | |
|---|---|
| Event Document Field | Details |
| searchKeywords | searchable terms for the event |
| DocumentType | document type (e.g., event) for results |
| venue_name | Name of the venue for the event |
| totalTickets | Actual number of tickets listed for the event |

Exemplary information parameters that may be included in a ticket index document are described below in the following table.

| Ticket Index Document Fields Table | |
|---|---|
| Ticket Document Field | Details |
| event_id | eventId of the event for which the tickets have been listed. |
| end_date | the date and time up to which the ticket can be sold. The listing becomes inactive and the ticket cannot be sold if the end date is passed. |
| Id | the ticket listing Id used to uniquely identify the listing |
| ticket_medium_id | medium of tickets.<br>1 = Paper tickets<br>2 = PDF tickets<br>3 = Barcode tickets |
| ticket_list_type_id | contains the different types of listings that can be posted. A listing may be a ticket (seat) or a parking pass or a combination.<br>1 = Ticket plus parking pass bundled<br>2 = Only tickets<br>3 = Only parking pass |
| sale_method_id | represents the type of sale method chosen by the seller for the listing.<br>0 = Auction listing<br>1 = Fixed price listing<br>2 = Declining price listing |
| quantity | number of tickets originally listed by the seller for an event |
| quantity_remain | number of individual tickets within a single ticket listing. This will start the same as the quantity originally listed and will be decremented as tickets are sold to reflect unsold quantity still available. |
| DocumentType | document type (e.g., ticket) for results |
| split_option | indicates if the ticket listing can be sold in multiple sub-batches rather than only as a single batch of tickets.<br>1 = ticket listing may be sold in multiples of the ticket_split number.<br>0 = ticket listing can only be sold as a single batch and not in multiple sub-batches. |
| ticket_split | When split_option = 1:<br>Never leave a quantity of 1 ticket remaining unless ticket_split is 1<br>Allow any multiple of ticket_split unless it breaks the above rules<br>Allow remainder of ticket_split multiples but only if this leaves an even split multiple |
| max_decay_price | upper limit for the ticket price in the declining price option |
| min_decay_price | lower limit for the ticket price in the declining price option |
| reserve_price | minimum price at which the seller would be willing to accept to sell his tickets |
| section | section of a seat within a venue |
| row_desc | row of a seat within a section of a venue |
| buy_it_now_price | price set by the seller to close the auction |
| start_price | depends on the value of the sale_method field |

-continued

Ticket Index Document Fields Table

| Ticket Document Field | Details |
|---|---|
| | Auction, start_price = bid starting price |
| | Declining, start_price = first offered price and will drop to reserve_price |
| | Saled, start_price = fixed price |
| curr_price | current price per individual ticket |
| system_status | current status of the listing (active, inactive, hidden, pending lock) |
| showTicketKeyStr | derived field based on data from other base fields. The first part of this value is the type of document which in this case is always ticket. The second part indicates if the listing is active or inactive. This string is set to a derived ACTIVE status if the ticket quantity remaining is greater than zero, if the system_status is active, and the event end_date is earlier than NOW. Otherwise the listing is considered INACTIVE. The final part represents event_id. Using this field reduces the number of separate fields to search against. For example, the clause of the query using this field would look like: +showTicketKeyStr:ticketACTIVE512528 |

The listing catalog server 138 may provide HTTP access for remote applications to query for the data internal to the network-based system 110. The listing catalog server 138 may return document data for each document satisfying the query as formatted text. A count of the number of documents returned may be provided in the header section of the response. The text format of the results can be specified in the HTTP Request or, by default, may be a proprietary XML format of the network-based system 110.

In various implementations, the listing catalog server 138 may employ classification data hierarchies or metadata to classify event and ticket listings according to independent search dimensions (e.g., Genre and Geo). Classifications form a hierarchy or tree of categories. For example, events may be classified into genres categories. Genres, in turn, are themselves classified into a hierarchical tree-like structure. Within a hierarchy, each event may be associated with an immediate parent genre where that parent genre is the most detailed category or is at the lowest level of the hierarchical tree. As an example, the general baseball tickets genre is a parent of the more specific team tickets genre, and this forms a genre classification hierarchy or tree. For instance, a genre classification hierarchy may be as follows: all tickets—sports tickets—baseball tickets—2008 MLB Tickets—2008 MLB regular season tickets—team tickets. In this hierarchy, the team tickets genre would be considered a leaf node of the genre dimension classification hierarchy.

Events also can also be classified into geographies or location categories. Geographies, in turn, are themselves classified into a hierarchical tree-like structure analogous to the genre hierarchy structure. Again, each event may be associated with an immediate parent genre where that parent geography is the most detailed category or is at the lowest level of the hierarchical tree structure.

The listing catalog server 138 may contain data types which may be queried for details or fact data regarding posted event and ticket listings. The fact data, in turn, may contain specific measures such as specific occurrences of quantity and price. Each document includes an identifier (id) field for containing a unique numeric identifier. This id field may be used to map relationships between multiple documents of different categories. For example, the genre parent field of an event document refers to the unique genre field of a genre document. Accordingly, the one-to-many relationship among the genre parent and several events may be represented in this manner.

The listing catalog server 138 may be arranged to receive and respond to the query with a response including the requested event information for the upcoming events. In some embodiments, the response provided by the listing catalog server 138 may include event information delivered via a web feed or other suitable delivery mechanism. While the event information may be received by the server-side web application implemented by the third party 114 via a request/response mechanism, it can be appreciated that alternatively and/or additionally, the listing catalog server 138 may periodically push event information to the server-side web application implemented by the third party 114 in some implementations.

Exemplary event information parameters that may be included in the response from the network-based system 110 are described below in the following table.

Event Information Parameter Table

| Event Parameter | Details |
|---|---|
| act_primary | Home Team Mascot |
| act_secondary | Away Team Mascot |
| active_type | 1 = active event |
| | 0 = inactive event |
| allowedtosell | 1 = general public allowed to sell tickets |
| | 0 = generatl public not allowed to sell tickets |
| ancestorGenreIds | List of parent IDs, in order of hierarchy, identifying browsing path to reach the node |
| ancestorGeoIds | List of geography IDs, in order of hierarchy, identifying browsing path to reach the geography node |
| canceled | 1 = event has been canceled |
| | 0 = event has not been canceled |
| channel | Name of the top level genre in the breadcrumb trail tied to the event |
| channelId | ID of the top level genre in the breadcrumb trail tied to the event |
| channelUrlPath | URL path for the top level genre in the breadcrumb trail tied to the event |
| channel_facet_str | ID and Name of the top level genre in the breadcrumb trail tied to the event |
| city | City of the event |
| date_last_modified | Time of last change to the event |
| description | Name of the event |
| eventDate_facet_str | Month and year of the event, numeric (yyyy-mm) and alpha (month, yyyy) |
| eventGeoDescription | Name of venue |
| event_date | Date and time of the event (GMT) |
| event_date_local | yyyy-mm-dd of the event |
| event_date_time | Date and local time of the event |
| event_id | Unique ID of the event |
| event_time_local | Local time of the event |
| genreUrlPath | URL path for the parent genre of the event |
| genre_parent | ID of the parent genre of the event |
| geoUrlPath | URL path for the venue of the event |
| geography_parent | ID of the parent geo of the venue |
| hide_event_date | 1 = event date hidden |
| | 0 = event date not hidden |
| id | ID of the event |
| last_chance | Date and time to delist the event used in place of the actual event date due to shipping rules |
| maxPrice | Highest ticket price for the event |
| maxSeatsTogether | Maximum number of successive seats that can be purchased together |
| minPrice | Lowest ticket price for the event |
| name_primary | Event match-up using team mascots (e.g., Mets vs Braves) |
| name_secondary | Full name of the away team (e.g., New York Mets) |

-continued

Event Information Parameter Table

| Event Parameter | Details |
| --- | --- |
| spark_event_flag | Event marked as a "hot" event |
| state | State of the event |
| totalPostings | Number of actual postings for the event |
| totalTickets | Actual number of tickets listed for the event |
| venue_config_id | Configuration of the venue for the event |

It can be appreciated that, in some implementations, not all of the event information parameters included in the table may be necessary to perform certain operations. Accordingly, when all parameters are included in a response, the response may be parsed to extract only those parameters that are needed. Alternatively, the query and/or the response may be configured to request and respond with only certain parameters. It also can be appreciated that different event information parameters and/or additional event information parameters than those described in the table may be used.

In accordance with various embodiments, the listing catalog server 138 may support the capabilities of the network-based system 110 to prioritize and process updated inventory information for event listing by responding to queries and providing access to, organizing, and/or storing event information the active events database 154. When prioritizing and processing updated inventory information for event listings, the network-based system 110 and/or the listing catalog server 138 may provide various domain-based capabilities (e.g., API capabilities). Exemplary inventory domain capabilities may include, without limitation, defining inventory entities, creating/updating/deleting inventory, getting inventory for a seller for an event, getting an inventory skeleton (e.g., tree of events for which inventory is available) for a seller, re-parenting inventory to a new event, deactivating inventory, and/or event granularity and en masse operations. Exemplary inventory/catalog domain capabilities may include, without limitation, finding matching events, creating placeholder events (e.g., for partial matches), scrubbing inventory for venue, and/or adding an alias to an event if a placeholder event maps directly to an existing event. Exemplary inventory/seller domain capabilities may include, without limitation, creating/updating/retrieving a listing manager file profile.

Dynamic Content Management Services

The dynamic content management server 140 implemented by one or more of the application servers 130 may be arranged to provide a user with relevant and/or related dynamic content customized according to a particular context of the user. The dynamic event information may comprise, for example, event information that changes as new event listings for upcoming events are added and as event listings are removed when the tickets for such event listings are purchased and real-time event-specific information such as current event listings, price ranges, and true levels of ticket inventory. Relevant or related dynamic content may comprise, for example, dynamic content customized according to the location of the user such as location-based advertising content (e.g., banner ads), relevant and/or related categories and subcategories (e.g., links for local sports teams, artists performing in the location, theater shows playing in the location), a list of event names and dates for upcoming events in the location arranged by category, and/or other type of dynamic featured content that changes according to the location of the user.

In some implementations, the appearance of a user interface displayed to the user may be customized or branded with dynamic content based on the location of the user and/or event criteria specified by the user. For example, a web page or web client may comprise a comprise a header, skin, or other designated area that dynamically displays different graphics (e.g., pictures, logos, backgrounds, etc.), advertisements, news, and/or other featured content received from the network-based system 110 according to the location and/or event criteria of the user.

In various embodiments, the dynamic content management server 140 may be structured, arranged, and/or configured to bind dynamic information to a particular node and/or combination of nodes defining the context of the user. Exemplary nodes may include, for example, geography nodes (e.g., event cities), category nodes (e.g., sports, concerts, theater), sports nodes (e.g., baseball, football, basketball), sports sub-category nodes (e.g., professional, college), music genre nodes (e.g., jazz, rock, alternative), theater subcategory nodes (e.g., musical, comedy), ticket subcategory nodes (e.g., regular season, playoff, bowl), conference nodes, team nodes, artist nodes, theater show nodes, venue nodes, event nodes, and so forth. It can be appreciated such nodes may be arranged (e.g., hierarchically) and/or in other ways in accordance with the described embodiments.

The dynamic content management server 140 may be configured bind dynamic content such as relevant and/or related categories and subcategories, event listings for upcoming events, promotional or advertising content, UI graphics, and/or various other types of customized content to a node or combination of nodes. When navigating a web site provided by the network-based system 110, for example, the user may be presented with links for selecting from among various locations, categories, and/or subcategories and for viewing content associated with such selections. When the user makes a particular selection, the context of the user may be defined by one or more nodes associated with such selection, and the user may be presented with dynamic content customized to the context of the user.

In various embodiments, the dynamic content management server 140 may implement a front-end query tool and presentation layer to query the listing catalog server 138 according to the context of the user. In response to the query, the dynamic content management server 140 may receive dynamic content (e.g., XML content) from the listing catalog server 138 and provide the dynamic content to one or more dynamic content modules embedded in a web page presented to the user. Accordingly, the content associated with event listings may change based on the context of the user, configurable parameters, and/or available inventory.

In one example, a user selects a particular city, and the dynamic content management server 140 has bound dynamic content to a geography node associated with the particular city. Upon selection of the particular city by the user, the context of the user may be defined at least in part by the geography node of the selected city, and the user may be presented with the dynamic content that is bound to the geography node. In this case, the user may be presented with a web page including dynamic content customized for the particular city such as graphics (e.g., pictures, background) and advertising content (e.g., banner ads) for the particular city, relevant and/or related categories and subcategories (e.g., links for local sports teams, artists performing in concert in the city, theater shows playing in the city), a list of event names and dates for upcoming events in the city arranged by category, and/or other type of dynamic content that changes according to the city selected by the user.

In another example, a user selects a particular football team, and the dynamic content management server 140 has bound dynamic content to a team node associated with the particular football team. Upon selection of the team by the user, the context of the user may be defined at least in part by the team node, and the user may be presented with the dynamic content that is bound to the team node. In this case, the user may be presented with a web page including dynamic content customized for the particular team. For example, the web page presented to the user may be dynamically branded with graphics (e.g., pictures, background), advertising content (e.g., banner ads), and/or news associated with the particular team. The user also may be presented with event listings for upcoming games for the team as well as relevant and/or related categories and subcategories (e.g., links for road games, playoff games) for the team. In this implementation, the context of the user may be defined by one or more other nodes in a hierarchical path to the team node such as a category node (e.g., sports), sports nodes (e.g., football), sports subcategory node (e.g., professional), and ticket subcategory node (e.g., regular season). As such, the user may be presented with dynamic content bound to one or more of such nodes such as links to other professional football teams for which regular season tickets are available.

It can be appreciated that the embodiments are not limited to the foregoing examples and that dynamic content may be bound to a particular nodes and/or a combination of nodes for customizing that content displayed to a user based on the context of the user. Accordingly, the dynamic content management server 140 may be used to create dynamic content campaigns including a various types of static and dynamic content and to bind such campaigns to nodes or groups of nodes that define a context of the user. It also can be appreciated that a node and/or combination of nodes can be detected as a user selects one more links and/or in other ways such as when a query is submitted (e.g., text entry, selection of checkboxes, selection from a pull-down menu), a search result is returned, or in any other way in accordance with the described embodiments.

Payment Services

The payment server 142 implemented by one or more of the application servers 130 may be arranged to effectuate and/or manage payments between buyers and sellers and to post and track financial transactions for users of the network-based system 110. Transaction information for past and pending transactions may be stored by the network-based system 110 in the transaction database 156. The payment server 142 also may provide dispute resolution mechanisms to handle payment disputes arising between transacting parties and/or fraud prevention mechanisms to prevent fraudulent transaction, unauthorized use of financial instruments, non-delivery of goods, abuse of personal information, and so forth. While the payment server 142 is shown in FIG. 1 as forming part of the networked-based system 110, it will be appreciated that the payment server 142 may form part of a third-party payment system that is separate and distinct from the network-based system 110 in alternative embodiments.

In various implementations, the payment server 142 may account for a transfer of funds and/or financial value by debiting the a source of funds and/or financial value linked to the subscriber account of the buyer and crediting a source of funds and/or financial value linked to the subscriber account of the seller. For example, the network-based system may securely communicate with one or more financial institutions such as a bank or credit card company over one or more networks 108 and arrange the transfer of funds and/or financial value from the buyer to the seller. It can be appreciated that while certain settlement mechanisms may be described for purposes of illustration, the embodiments are not limited in this regard, and a variety of settlement networks and modalities may be used in accordance with the described embodiments.

In one embodiment, after the buyer reviews and confirms an order, the account (e.g., credit card) of the buyer is verified, and the sale amount (e.g., ticket price plus delivery cost) is authorized. The seller is notified of the proposed purchase by e-mail or other notification mechanism and requested to confirm that the tickets are still available and that the transaction can be completed.

Upon receiving confirmation from the seller, the account (e.g., credit card) of the buyer is charged. Funds from the account of the buyer may be electronically transferred into a merchant account associated with the network-based system 110, and a transaction fee may be deducted. The remaining proceeds are then directed to the seller by issuing a payment in accordance with the payment method selected by the seller such as via check, deposit to a third-party payment services account (e.g., PayPal™ account), Season Ticket Account, and/or other type of source capable of receiving funds and/or financial value, and/or donation to a third-party such as a non-profit organization or entity.

It can be appreciated that the network-based system 110 may provide a "double blind" complete ticket-sale transaction without interaction between buyer and seller. Namely, the network-based system 110 may facilitate an entire ticket-sale transaction without requiring any interaction between the seller and the buyer. The network-based system 110 controls and/or facilitates the entire sale and purchase process and serves as an intermediary between the buyer and seller effectively isolating the participation of the seller in the transaction from the participation of the buyer in the transaction. Accordingly, the identity of one transacting party can remain concealed from the other.

Notification Services

The notification server 144 implemented by one or more of the application servers 130 may be arranged to generate and send various types of notifications to users of the network-based system 110. The notification server 144 may communicate with users over one or more types of networks 108 (e.g., the Internet, a WAN, a WWAN, a WLAN, a mobile telephone network, a landline telephone network, a VoIP network, etc.) via interfaces provided the communications servers 120 such as the web server 122, API server 124, and/or messaging server 126. It can be appreciated that, in some implementations, notifications may be forwarded to users via an intermediary such as an Internet Service Provider (ISP), online service provider (OSP), web-based e-mail service provider, message aggregator (e.g., SMS aggregator), mobile transaction network entity, and so forth.

The notifications may comprise messages delivered to users via e-mail, IM, SMS, MMS, video message, telephone call as well as messages delivered to the subscriber account of the user. In some cases, the notifications may provide the user with information related to various online marketplace transactions. For example, notifications may be sent to sellers for indicating the status of event listings, informing the seller of offers (e.g., auction bids) for event listings or sales of similar tickets and allowing the user to modify the prices of event listings, notifying the seller of placed orders and requesting confirmation of the availability of tickets for such orders, providing delivery instructions and requesting confirmation of delivery, tracking shipped orders, providing the status of payments, and so forth. Notifications may be sent to buyers for tracking ticket purchase transactions (e.g., active bids, auctions lost) for event listings and allowing the buyer to modify offers, confirming an order and delivery, tracking shipped orders, providing pick-up instructions and requesting confirmation of receipt, downloading and print electronic tickets, and so forth.

In various embodiments, the user may subscribe to receive customized alert notifications for upcoming events as described in co-pending U.S. patent application Ser. No. 12/262,468 titled "System and Methods for Upcoming Event Notification and Mobile Purchasing," which was filed on Oct. 31, 2008 and is incorporated by reference in its entirety. In such embodiments, the notification server 144 may be arranged to generate and send an alert notification comprising a text message including relevant static or dynamic event information as well as an embedded hyperlink. The hyperlink may comprise a hyperlinked telephone number for allowing the user to place a telephone call to an agent of the network-based system 110 for transacting a mobile purchase. Alternatively or additionally, the hyperlink may comprise a URL or URI for navigating to the network-based system 110 for transacting the mobile purchase.

It can be appreciated that in some cases, an upcoming event may not satisfy all event criteria specified by the user. In some implementations, when there are no upcoming events that satisfy all the event criteria specified by the user, the user may select to receive alert notifications for one or more upcoming events conditioned on the complete satisfaction of the event criteria. In such implementations, the network-based system 110 may allow the user to select to receive an alert notification whenever an upcoming event that substantially and/or completely satisfies the search criteria is listed. For example, the user may select to receive "on sale" alert notifications when tickets that satisfy one or more preferences of the user become available. The network-based system 110 also may provide the user with various capabilities (e.g., preference settings and options) to allow the user to receive "on sale" alert notifications for preferred tickets and to allow the user to automatically and/or optionally purchase such preferred tickets.

In accordance with various embodiments, a seller such as high-volume seller (e.g., ticket broker) may communicate updated inventory information to the network-based system 110 which, in turn, may be prioritized and processed. In such embodiments, the stages involved in receiving, prioritizing, and processing updated inventory information may be monitored by the network-based system 110. For example, the updating of inventory information according to one or more received inventory files (e.g., full file jobs, delta jobs, consolidator jobs) may be broken into a receiving stage, a prioritizing stage, and a processing stage. Each stage may be monitored, and event logs may be generated and reported when a file arrives, when file data is prioritized, and when prioritized file data is processed. Service level agreements (SLAs) may be established so that a network operations center (NOC) may log, track, and generated appropriate alerts in accordance with SLA contracts. All failure modes and corresponding stages may be recorded when errors occur. In the event that a failure condition is encountered at any stage, notifications may be provided to the subscriber account and/or a computing device of the seller (e.g., broker) as well as one or more customer service agents (e.g., large seller support team, event management team) of the network-based system 110. It can be appreciated that decoupling processing stages from each other provides more robustness and visibility into where problems may occur.

Delivery Services

The delivery server 146 implemented by one or more of the application servers 130 may arrange the delivery of goods from the seller to the buyer. For the delivery of time-sensitive goods such as a single or multiple event tickets, the network-based system 110 may determine and present delivery options that ensure that an event ticket is delivered to the buyer before an event and the costs associated with such delivery options.

In various embodiments, the network-based system 110 may coordinate the delivery of event tickets as described in co-pending U.S. patent application Ser. No. 09/867,171 titled "System and Method for Providing Logistics for a Sale of Goods," which was filed on Sep. 27, 2001 and is incorporated by reference in its entirety. In such embodiments, the network-based system 110 may automatically arrange and/or facilitate the logistics for the delivery of event tickets from the seller to the buyer.

In one implementation, for example, when the buyer places an order, available delivery options are presented to the buyer that ensure that the event tickets can be delivered before the event either to the buyer or to a pick-up location (e.g., event venue will call or an office of the network-based system 110) in proximity to the buyer. The network-based system 110 may determine all available delivery options based on the form of the tickets (e.g., physical tickets, electronic tickets), the time remaining before the event, the location of the goods, the location of the buyer, pick-up locations in proximity to the buyer, and/or the capabilities one or more couriers (e.g., air/land couriers, express couriers, local couriers or "runners") that can execute the delivery within the time remaining before the event.

When a physical ticket is to be delivered, the network-based system 110 may determine and present shipping options to the buyer. The buyer may provide a delivery or pick-up location, and the network-based system 110 may automatically determine couriers capable of ensuring delivery and present a list identifying the couriers, the available shipping methods (e.g., two day, one day, overnight, same day) for each courier, and the associated cost of each shipping method.

When a courier and shipping method is selected by the buyer, the seller may be notified and presented with a printable shipping label for the courier and logistics for providing the tickets to the courier. For example, the network-based system 110 may automatically determine the closest courier facility in proximity to the seller and may allow and arrange for the courier to retrieve the tickets. In such cases, the network-based system 110 may communicate relevant information (e.g., seller address, delivery address, pick-up day and time frame) to the courier in order to coordinate ticket retrieval. If the courier cannot service any of the selected locations at any of the selected times, the network-based system 110 may require the seller to drop off the tickets at the nearest courier facility. The seller also may select to drop off the tickets at the nearest courier facility. If the seller selects or is required to drop off the tickets, the buyer may be provided with the location of the courier facility, driving or walking directions to the courier facility, and/or a map showing the courier facility.

Upon confirmation by the seller that the tickets have been sent or picked up, the network-based system 110 may communicate delivery tracking information to the buyer and/or seller. The network-based system 110 may notify the buyer of the delivery location and expected time and date of delivery. If the delivery location is at a pick-up location such as the event venue will call or an office associated with the network-based system 110, the buyer may be provided with the pick-up location, driving or walking directions to the pick-up location, and/or a map showing the pick-up location.

To ensure delivery to the buyer before an event, a last sale time may be associated with an event listing. In some cases, for example, the last sale time for an event listing may be three business days before the event to provide sufficient transit time to ensure completion of delivery. In such cases, the event listing will expire at the last sale time.

Last Minute Services

It can be appreciated that both sellers and buyers may desire the last sale time to be as close to the event start time as possible in order to maximize the opportunity to make a sale and the opportunity to witness an event. Accordingly, the network-based system 110 may provide sellers and buyers with various last minute services (LMS) for maintaining an event listing and the ability to sell and purchase listed tickets right up to the start of the event.

In one implementation, for example, the network-based system 110 may allow tickets to be sold on consignment and may maintain an event listing until the start of the event. When a seller requires delivery of physical tickets for an upcoming event, the seller may select to sell the tickets using LMS provided by the network-based system 110. The seller may request LMS and provide the network-based system 110 with contact information (e.g., name, address, telephone number, e-mail address), ticket information (e.g., event name, event venue, ticket event dates, closest city to the event), and authorization to release the tickets.

In response to the LMS request, the seller may be contacted by an agent of the network-based system 110 via telephone or other contact method and provided with additional selling information. Depending on the time remaining before the event, the seller may be instructed to ship or physically deliver the tickets to an LMS center associated with the network-based system 110. Typically, the location of the LMS center will be in close proximity to the event venue. The seller also may select to physically deliver the tickets to the LMS center. When physical delivery of the ticket to the LMS center is required or selected, the seller may be provided with the location of the LMS center, driving or walking directions to the LMS center, and/or a map showing the LMS center.

Once the tickets are delivered to the LMS center, the event listing may be maintained until the start of the event and the subsequent delivery of the tickets to a buyer is handled by the network-based system 110. For example, the LMS center and/or the network-based system 110 may handle the responsibility of shipping the tickets to the buyer, delivering the tickets to the event venue will call, and/or the keeping the tickets at the LMS center until pick-up by the buyer. It can be appreciated that the LMS provided by the network-based system 110 may facilitate delivery and allow the network-based system 110 to defer the last sale time until the start of the event.

In some embodiments, an LMS center may employ an inventory management and/or accounting system capable of providing real-time inventory updates to the network-based system 110. In other embodiments, the LMS center may provide a batch of updated inventory to the network-based system 110 which, in turn, may be prioritized and/or processed as described herein.

Electronic Ticketing Services

In various embodiments, the network-based system 110 may provide electronic ticketing services for allowing a buyer to purchase one or more electronic tickets that can be used at the event venue. It can be appreciated that providing such electronic ticketing services may allow the network-based system 110 to defer the last sale time until the start of the event.

When the user selects an upcoming event from event listings published by the network-based system 110, a web page may be presented to the user that includes event information for the selected upcoming event such as the name of the event, the date and time of the event, the event venue, available ticket listings including ticket attributes (e.g., section, row, quantity, price), and so forth. In some cases, a purchaser of event tickets may provide the event information to the network-based system 110 in order to list the tickets for sale on a secondary market. In other cases, the venue, event promoter, or other type of ticket issuer may provide the network-based system 110 with event details such as event description, event venue, event date and time, artist, and so forth. In response, the network-based system 110 may manage the event, enable the venue to sell tickets for the event, manage the generation and distribution of electronic tickets, and facilitate the use of electronic tickets for access control to the venue. For example, the network-based system 110 may create an event listing, generate electronic tickets, publish available tickets for sale, and coordinate the sale of the electronic tickets.

In various embodiments, a web page presented to a user may comprise the event information along with a link to purchase electronic tickets and/or a link to view additional details. By clicking the link to purchase electronic tickets, the user may initiate a purchase of one or more electronic tickets. By clicking the link to view additional details, a subsequent web page may be displayed including ticket attributes along with further ticket details (e.g., seat numbers, time remaining to purchase the tickets, seller comments, delivery options), a selectively enlargeable image of the event venue for reviewing the location of the seats, and an action button for initiating purchase of the tickets. In some cases, one or more web pages may include a link to view delivery options such as a location of, driving or walking directions to, and/or a map showing a pick-up location.

To effectuate an electronic ticket purchase, the user may be prompted to enter account information such as a unique username or e-mail address and a password. Upon receiving the required account information, the user is authenticated with the network-based system 110 and may initiate an electronic ticket purchase. After authentication, the network-based system 110 may transact the purchase using a source of financial value linked to the subscriber account of the user or may request the user to supply payment information (e.g., credit card account, PayPal™ account, etc.) for the transaction.

In various embodiments, a user may purchase electronic tickets and/or save electronic ticket information using a web client such as a web browser, web browser toolbar, and/or a desktop or mobile widget. For example, a user may save an electronic ticket and/or a hyperlink to a file associated with the electronic ticket in a subscriber account, in the web browser toolbar, and/or within a desktop or mobile widget. The user also may display information for and differentiate among purchased electronic tickets on a client device (e.g., PC or mobile device) via the web client.

The buyer may purchase one or more electronic tickets using a credit card or other source of funds or financial value linked to the subscriber account of the buyer. In one or more embodiments, the network-based system 110 may provide variable distribution and access control for purchased electronic tickers. For example, the network-based system 110 may provide the buyer with various delivery options for receiving and/or delivering the purchased electronic tickets.

The network-based system 110 may allow the buyer to have the electronic tickets delivered to an e-mail address associated with the buyer. The buyer may access the e-mail account, display the electronic tickets, and print out paper copies of the electronic tickets. Each of the paper copies of the electronic tickets may include a bar code which can be scanned at the event venue to allow access.

Alternatively or additionally, the buyer may instruct the network-based system 110 to send an electronic ticket to a mobile device (e.g., mobile phone or PDA) associated with the buyer. For example, the buyer may receive the electronic ticket at the mobile device and display a bar code of the electronic ticket on a screen of the mobile device which may be scanned at the event venue to grant access. In some usage scenarios, the buyer may receive an SMS message sent to a mobile device that includes a link to a web page to render a ticket. In other usage scenarios, the buyer may receive an MMS message sent to a mobile device that includes an image of the ticket. When the buyer chooses delivery to a mobile device, the buyer also may receive the ticket via e-mail as a backup in case the buyer wants to print out a paper copy to bring to or use at the event venue. The buyer may receive a text message at the time of ticket purchase and, if the tickets are purchased more than a predetermined time before the event (e.g., two days before the event), a reminder text message just before (e.g., one day prior to) the event.

In various embodiments, when the buyer purchases electronic tickets using a credit card, the buyer may access the venue by swiping the credit card used to make the purchase at the event venue. Alternatively or additionally, the buyer may use a driver's license to validate the ticket at the event venue. In some implementations, only the buyer may use the credit card used to make the purchase or a driver's license as a means of entry at the event venue. It can be appreciated that in such implementations, the buyer may validate his/her ticket at the venue as well as validate other purchased tickets for other people who are present with the buyer at the time of entry into the event venue.

The network-based system 110 also may provide the buyer with various delivery options for splitting the distribution of a single order of multiple electronic tickets among one or more recipients in addition to and/or other than the buyer. In some cases, for example, a buyer may purchase multiple electronic tickets (e.g., block of four electronic tickets) at once in a single order. In such cases, the buyer may choose from the provided options for variably distributing one or more of the purchased electronic tickets and/or the underlying rights associated with one or more of the purchased electronic tickets to different end recipients using different delivery mechanisms.

In various implementations, when a buyer purchases more than one ticket, the buyer may choose to have the tickets delivered directly to one or more other recipients for use at the event venue. For example, when multiple tickets are purchased in one order, the buyer can decide how individual tickets will be delivered electronically (e.g., e-mail, SMS, MMS, etc.) to another person. Upon delivery, each ticket may be used by the recipient independently of the buyer arriving at the event so that the entire party does not need to be present to enter the event venue. In such implementations, the buyer may be presented with delivery options as described in co-pending U.S. patent application Ser. No. 12/325,789 titled "System and Methods for Variable Distribution and Access Control for Purchased Event Tickets," which was filed on Dec. 1, 2008 and is incorporated by reference in its entirety.

In various implementations, the network-based system 110 may communicate the access rights to an electronic ticketing system at the event venue to associate the electronic ticket with the buyer and/or one or more recipients. Access control at the event venue may be done by a scanner that will read a bar code contained on the ticket sent as described above. In some cases, the buyer may access the venue by swiping the credit card used to make the purchase at the event venue or a driver's license. The buyer also may validate other purchased tickets for other people who are present with the buyer at the time of entry into the event venue. Each ticket delivered to a recipient may be used independently of the buyer arriving at the event so that buyer does not need to be present for the recipient to enter the event venue.

As the purchaser, the buyer may retain ownership and control of the distribution of the tickets. The network-based system 110 allows the purchased tickets to be easily delivered to different end recipients and may be configured to distribute the purchased electronic tickets and/or the underlying rights associated with electronic tickets differently based on ownership. In various embodiments, the tickets and/or the underlying rights associated with the tickets may be distributed to different end recipients by the network-based system 110 without affecting ownership, without relisting the tickets, and/or without requiring the recipients to purchase the tickets.

It can be appreciated that when ownership and control of the tickets is retained by the original purchaser, the ability of a recipient to resell the tickets may be restricted. In some cases, however, the purchaser may choose to transfer complete ownership of an electronic ticket and/or the underlying rights associated with the electronic ticket to a recipient. In various embodiments, the network-based system 110 may be configured to support and broker the transfer of electronic tickets from the purchaser to multiple end recipients as well as from a recipient to another individual (e.g., buyer or other recipient). For example, the network-based system 110 may allow a recipient to list a received ticket for sale and may automatically handle the assignment of rights to a subsequent buyer when the ticket is purchased.

In cases where ownership and the underlying rights of an electronic ticket are transferred from the purchaser, the network-based system 110 may communicate access rights to an electronic ticketing system at the event venue to associate the electronic ticket with a different individual (e.g., recipient or subsequent buyer). In some embodiments, the network-based system 110 may instruct the ticketing system to activate new electronic tickets with new bar codes and to deactivate the original electronic tickets and original bar codes of the purchaser. The new electronic tickets can be delivered by the network-based system 110 and/or the electronic ticketing system for use by the recipient or subsequent buyer.

Alternatively or additionally, the network-based system 110 may instruct the ticketing system to associate new identification and/or authorization information (e.g., credit card, swipe card, password, pin code) with the electronic tickets and to deactivate identification and/or authorization information of the purchaser from the electronic tickets. Upon providing the required identification and/or authorization information to the electronic ticketing system, to a kiosk at the event venue, and/or to the network-based system 110, the recipient or subsequent buyer can use the electronic ticket to access the event venue.

As described above, the network-based system 110 may provide listing manager services for receiving, prioritizing, and processing updated inventory information. In various usage scenarios, the listing manager services may be provided to large-volume sellers (e.g., ticket brokers) in conjunction with selling services and/or other services provided by the network-based system 110.

Figure 2:
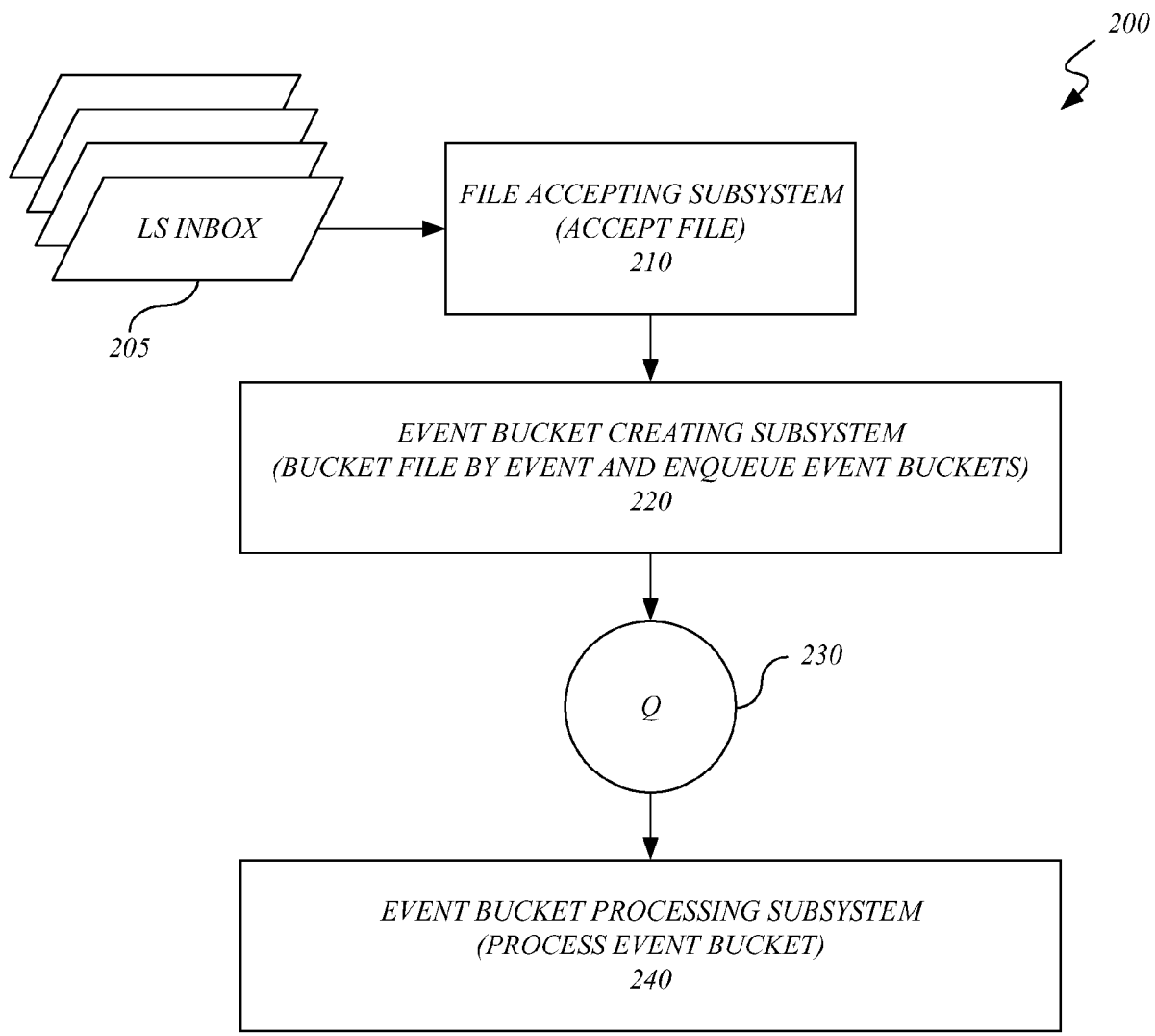
FIG. 2 illustrates a listing manager system for prioritizing and processing updated inventory information for event listings in accordance with various embodiments.

FIG. 2 illustrates an exemplary listing manager system 200 for prioritizing and processing updated inventory information for event listings in accordance with various embodiments. The listing manager system 200 may be configured, for example, to receive updated ticket inventory and to prioritize and process workloads to ensure that published ticket listings reflect updated inventory available for sale, especially during critical time periods associated with an event. With reference to FIG. 1, the listing manager system 200 may be implemented by one or more of the communications servers 120, application servers 130, and/or databases 150 of the network-based system 110 which, in turn, may provide online marketplace (e.g., secondary ticket market) and ticket fulfillment services. The embodiments, however, are not limited to this context.

In various implementations, the listing manager system 200 may be configured to receive updated ticket information from a seller for multiple event listings, categorize (e.g., bucket) the updated ticket information from the seller by event, prioritize event categories (e.g., event buckets) comprising updated ticket information in accordance with a prioritization policy, and process a prioritized event category comprising updated ticket information for a particular event listing out-of-order with respect to one or more other event categories comprising previously-received updated ticket information for other event listings. The prioritization policy may ensure that multiple updates for a specific event listing are processed in order according to time received by the listing manager system 200.

As shown, in FIG. 2, the listing manager system 200 may comprise functional subsystems including a file accepting subsystem 210 to accept a file comprising updated inventory information, an event bucket creating subsystem 220 to create event buckets by bucketing the file by event and to enqueue the event buckets into a priority queue 230, and an event bucket processing subsystem 240 to process an event bucket from the priority queue 230.

The accepting subsystem 210 may be configured to receive updated inventory information that is uploaded to one or more large seller (LS) inboxes such as LS inbox 205. In various implementations, the LS inboxes may comprise FTP inboxes associated with high-volume or large sellers such as ticket brokers. Each LS inbox may correspond, for example, to a particular seller (e.g., ticket broker) and may be associated with a particular LS identifier (LS ID) of the seller.

As described above, in some usage scenarios a seller may manage and update inventory on a POS and/or inventory management system and then communicate a batch of updated inventory information to the network-based system 110. The batch of updated inventory may comprise, for example, a file that is exported from the POS and/or inventory management system of the seller to a particular inbox (e.g., LS inbox 205) associated with the seller. In some cases, the file may comprise a full file job listing of all inventory of the seller, a delta job listing changes to inventory information previously sent or uploaded, and/or a consolidator job listing inventory information associated with multiple different sellers which, in turn, may include full file jobs and/or delta jobs for different ticket brokers.

The accepting subsystem 210 may be configured to monitor the LS inboxes for files uploaded by sellers. In some embodiments, the accepting subsystem 210 may be configured to monitor particular LS inboxes for certain types of files (e.g., full update, delta, consolidated, etc). For example, the file type(s) for a particular LS inbox may be stored in a profile linked to the LS ID of the seller. In some cases, different file types may require different queuing and/or processing and may be distinguished (e.g., tagged) by the accepting subsystem 210.

In various implementations, the accepting subsystem 210 may employ multiple servers for scanning and/or polling the LS inboxes in parallel so that multiple polling jobs may run concurrently. Accordingly, the accepting subsystem 210 may be configured to avoid resource starvation. A typically starvation situation is when files are taken in order, and a seller submits a very large file which unfairly consumes resources. In this situation, other files of other sellers which may include important updates to inventory may be deprived of processing until the resources being consumed by the large file are released. It can be appreciated that the use of multiple servers to perform parallel polling is designed to take fairness into consideration when allocating resources and to avoid starvation situations.

Upon detecting uploaded files in the LS inboxes, the accepting subsystem 210 may move the files from the LS inboxes into the appropriate archival table. In various embodiments, an archive file is created as a raw copy of the file to log an event when a file arrives and keep a record of when updated inventory information was received. In some cases, archive files may be used for dispute resolution with brokers. The accepting subsystem 210 may then enqueue the file for further processing by the event bucket creating subsystem 220. In various implementations, the accepting subsystem 210 may enqueue the file using the job-scheduling facilities (e.g., gen3 quartz-based facilities) of the network-based system 110 and/or may notify the event bucket creating subsystem 220 that a new file is ready for processing.

The event bucket creating subsystem 220 may request and/or receive an unprocessed file containing inventory uploaded to an FTP area (e.g., LS inboxes of external partners) to create event buckets. In various implementations, the files may be normalized, for example, by column order using a column-name scheme. The event bucket creating subsystem 220 may group a file in memory, for example, by event using raw event information in the file. For example, the event bucket creating subsystem 220 may retrieve rows grouped by raw event information in the file.

In one or more embodiments, the event bucket creating subsystem 220 may perform event scrubbing to ensure that the events listed in the file correspond to events recognized by the network-based system 110. In such embodiments, the event bucket creating subsystem 220 may convert raw events into events recognized by the network-based system 110, for example, by performing an event lookup (e.g., LCS-based search). In the event that an event listed in the file does not convert (e.g., less-than 100% confidence matches) and/or no suitable corresponding event recognized by the network-based system 110 is found, the event bucket creating subsystem 220 may perform event scrubbing which creates a temporary placeholder event to hold the inventory. The event bucket creating subsystem 220 may enqueue an event mapping request so that subsequently an agent (e.g., event management team) of the network-based system may re-parent the inventory and/or add an alias to an event if a placeholder event maps directly to an existing event. In some cases, the event scrubbing may require an e-mail to be sent to the seller requesting further information regarding the event so that an event can be created.

The event bucket creating subsystem 220 may then create event buckets and bucket the inventory information in the file by event. In various embodiments, multiple servers may be working concurrently on files to create event buckets. An event may be logged when all event buckets are created from a file. The event bucket creating subsystem 220 may then update the file record and enqueue the event buckets into the priority queue 230. In various implementations, file processing by the event bucket creating subsystem 220 is atomic to ensure that a given file will be processed exactly once and the event buckets will be inserted into the priority queue 230 exactly once.

It can be appreciated that while the updated inventory information may be categorized or bucketed at the event level, the embodiments are not limited in this regard. In some implementations, for example, updated inventory information may be categorized or bucketed according to section (e.g., floor section), row (e.g., front row), or other suitable ticket level criteria. Accordingly, the prioritization of categories or buckets comprising updated inventory information may be based on various ticket level criteria in some embodiments.

The event bucket processing subsystem 240 may process an event bucket from the priority queue 230 in accordance with a prioritization policy. In various implementations, the event buckets may be placed into and/or retrieved from the priority queue 230 based on the prioritization policy. In accordance with the prioritization policy, a prioritized event bucket comprising updated ticket information for a particular event listing may be processed out-of-order with respect to one or more other event buckets comprising previously-received updated ticket information for other event listings. It can be appreciated that while FIG. 2 shows only one priority queue 230 for purposes of illustration, the listing manager system 200 may comprise multiple priority queues. For example, different priority queues may be associated with different priority levels, and event buckets may be placed into and/or retrieved from such queues based on prioritization of the queues.

In accordance with various embodiments, the event buckets comprising updated ticket inventory may be prioritized based on one or more factors. In general, prioritization of the event buckets may be designed to ensure that most valuable and/or important inventory information is updated as soon as possible and/or out-of-order with respect to less valuable and/or less important inventory information. In some embodiments, for example, prioritization may be based on when an event is to occur such as the time remaining before the event date. Because tickets for the event will have no value after the event date, the prioritization policy may ensure that event buckets containing updated inventory information for an event with an event date occurring within a certain threshold time period (e.g., 48 hours) are placed into and/or retrieved from the priority queue 230 ahead of other event buckets containing updated inventory information for later-occurring events.

In some embodiments, prioritization may be based on the on-sale date for tickets to an event. Since the days including and/or immediately following the on-sale date for tickets to an event generally are time periods of high activity for buying and selling, the prioritization policy may ensure that event buckets containing updated inventory information for an event with an on-sale date that is recent (e.g., within 48 hours) or impending (e.g., within 24 hours) or are placed into and/or retrieved from the priority queue 230 ahead of other event buckets when the timing associated with events of the other event buckets is less critical. For example, the timing for an event may be less critical during the time period between the days including and/or immediately following the on-sale date and the days immediately preceding and/or including the event date which is generally a time of lower activity for ticket sales. Because tickets for the event will have no value after the event date, the prioritization policy still may ensure that event buckets containing updated inventory information for an event with an impending event date are placed into and/or retrieved from the priority queue 230 ahead of event buckets containing updated inventory information for an event with a recent or impending on-sale date.

Additionally or alternatively, prioritization may be based on whether the updated inventory information is deleting inventory, adding inventory, and/or merely updating ticket details. Because the accuracy of the remaining inventory for an event may be more important relative to whether additional tickets for an event are available, the prioritization policy may ensure that event buckets containing updated inventory information that deletes inventory are placed into and/or retrieved from the priority queue 230 ahead of other event buckets containing updated inventory information that adds inventory and/or updates ticket details.

In some embodiments, prioritization also may be based on a priority level (e.g., platinum, gold, silver, etc.) associated with a seller. In such embodiments, event buckets containing updated inventory information for certain sellers may be placed into and/or retrieved from the priority queue 230 ahead of inventory updates from other sellers according to criteria such as number of listings, volume of sales, commission generated, comments (e.g., positive or negative feedback), and so forth. In some cases, a seller may pay a premium (e.g., fixed fee, additional commission percentage) to obtain a particular priority level. In such cases, event buckets containing updated inventory information for certain sellers may be placed into and/or retrieved from the priority queue 230 ahead of inventory updates for other sellers according to such premiums.

In implementations where the seller pays a premium for obtaining a priority level, the prioritization policy may ensure that inventory updates from a priority seller are taken ahead of inventory updates from a non-priority or lower-priority seller in situations where updated inventory information is being submitted for the same impending event. In some cases, the prioritization policy even may ensure that inventory updates from a priority seller are taken ahead of inventory updates from non-priority or lower-priority sellers regardless of the timing of an event. For example, the inventory updates from a priority seller may placed into and/or retrieved from the event bucket priority queue 230 ahead of inventory updates from non-priority or lower-priority sellers even if the inventory updates from the non-priority or lower-priority sellers are for events having impending event dates and/or recent on-sale dates.

Upon receiving an event bucket from the priority queue 240, the event bucket processing subsystem 240 may process the event bucket by retrieving inventory information by seller and event. In various implementations, the event bucket processing subsystem 240 may be configured to ensure in-order processing for a given seller. For example, to avoid out-of-order updates of inventory, files broken up by event are processed according to a file arrival/creation time as determined by the network-based system 110. In the event that multiple event buckets for a given seller are updating the same event, the event buckets for the given seller files are processed in order by file arrival time.

In one or more embodiments, the event bucket processing subsystem 240 may be configured to ensure in-order processing for event listings. Although various listings may be processed out-of-order given the prioritization policy, the event bucket processing subsystem 240 shall ensure that updates for a specific listing are applied in order by file arrival time. Accordingly, when a particular seller makes multiple updates to available ticket inventory or ticket pricing for a specific listing, the updates are processed in order of arrival to ensure that the specific listing is published with accurate and up-to-date information. For example, if a seller mistakenly submits a lower price and then submits an updated higher price for a listing, the updated higher price is processed after the low price to ensure that the listing reflects the most recent price update.

The event bucket processing subsystem 240 may then compute differences between the inventory information of the seller included in the event bucket against the inventory associated with the seller that is currently listed for a given event. In one or more embodiments, the event bucket processing subsystem 240 may perform venue scrubbing so that the data can be conditioned as soon as possible and reported back to the seller (e.g., ticket broker) or agent (e.g., large seller account manager or venue management team) of the network-based system 110 to report how well data is being scrubbed. Venue scrubbing may comprise, for example, matching updated inventory information for a venue against recognized venues, creating a placeholder for an unmatched venue, and submitting a mapping request for the unmatched venue.

The event bucket processing subsystem 240 may update the inventory of the seller listed by the network-based system 110. The event bucket processing subsystem 240 may then update the file and the bucket record to note when an event bucket has been processed. In various implementations, the event bucket processing subsystem 240 may generate and/or maintain a stable ticket ID in the event that a ticket ID is not provided in the original input file. The event bucket processing subsystem 240 generally will not consolidate listings that are in the same row.

Figure 3:
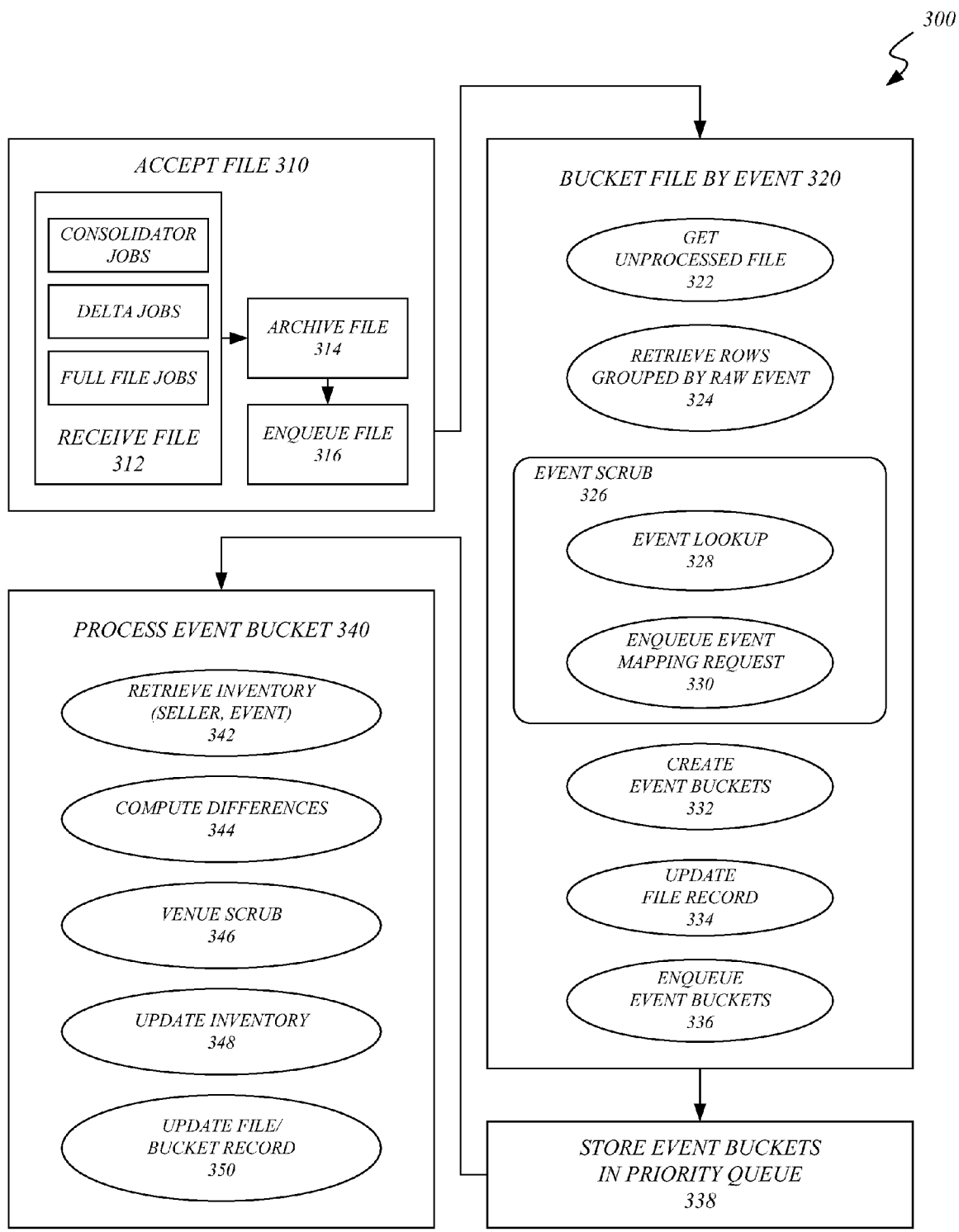
FIG. 3 illustrates a logic flow including operations performed by a computer for prioritizing and processing updated inventory information for event listings in accordance with various embodiments.

FIG. 3 illustrates a logic flow 300 including operations performed by a computer for prioritizing and processing updated inventory information for event listings in accordance with various embodiments. The logic flow 300 may be performed by various systems and/or devices and may be implemented as hardware, software, firmware, and/or any combination thereof, as desired for a given set of design parameters or performance constraints. For example, the logic flow 300 may be implemented by a logic device (e.g., computer and/or processor) and/or logic (e.g., computer executable program instructions) to be executed by a logic device.

As shown, the logic flow 300 may comprise logic and/or operations to accept a file (block 310) which, in turn, may include logic and/or operations to receive a file (e.g., consolidator jobs, delta jobs, full file jobs) (block 312), archive a file (block 314), and enqueue a file (block 316).

The logic flow 300 may comprise logic and/or operations to bucket a file by event (block 320) which, in turn, may include logic and/or operations to get an unprocessed file (block 322) and retrieve rows grouped by raw event (block 324). As shown, bucketing a file by event (block 320) may include logic and/or operations to perform an event scrub (block 326) which, in turn, comprises logic and/or operations to perform an event lookup (block 328) and enqueue an event mapping request (block 330). Bucketing a file by event (block 320) also may comprise logic and/or operations to create event buckets (block 332), update a file record (block 334), and enqueue event buckets (block 336).

The logic flow 300 may comprise logic and/or operations to store event buckets in a priority queue (block 338) and to process an event bucket (block 340). In various embodiments, an event bucket may be processed in accordance with a prioritization policy. For example, an event bucket may be placed into and/or retrieved from a priority queue based on the prioritization policy. In accordance with the prioritization policy, a prioritized event bucket comprising updated ticket information for a particular event listing may be processed out-of-order with respect to one or more other event buckets comprising previously-received updated ticket information for other event listings. The prioritization policy may ensure that multiple updates for a specific event listing are processed in order according to time received.

As shown, processing an event bucket (block 340) may comprise logic and/or operations to retrieve inventory by seller and event (block 342), compute differences (block 344), perform a venue scrub (block 346), update inventory (block 348), and update a file/bucket record (block 350).

It can be appreciated that while the logic flow 300 may illustrate a certain sequence of logic and/or steps, other sequences of logic and/or steps may also be performed in accordance with the described embodiments. Moreover, some individual steps of the logic flow 300 may include multiple sub-steps that may be performed in various sequences as appropriate to the individual step. Furthermore, additional steps may be added or some steps may be removed depending on the particular implementation.

In various embodiments, one or more operations of the logic flow 300 may comprise, or be implemented as, executable computer program instructions. The executable computer program instructions may be implemented by software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable programming language in accordance with the described embodiments.

In various embodiments, one or more operations of the logic flow 300 may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

Although some embodiments may be illustrated and described as comprising exemplary functional components or modules performing various operations, it can be appreciated that such components or modules may be implemented by one or more hardware components, software components, firmware components, and/or combination thereof.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A computer-implemented method comprising:
   receiving updated ticket inventory information from a plurality of sellers for multiple event listings at a network-based system;
   processing, in parallel and electronically by one or more hardware processors, the updated ticket information from at least two of the plurality of sellers;
   categorizing, electronically by one or more hardware processors, the updated ticket inventory information from the sellers by event;
   prioritizing, electronically by one or more hardware processors, event categories comprising updated ticket inventory information in accordance with a prioritization policy, wherein updated ticket inventory information for an event received between a first date based on an on-sale date of the event and a second date based on a date of the event is prioritized lower than updated ticket inventory information received earlier than the first date or later than the second date; and
   processing, electronically by one or more hardware processors, a prioritized event category comprising updated ticket inventory information for a particular event listing out-of-order with respect to one or more other event categories comprising previously-received updated ticket inventory information for other event listings;
   wherein processing the prioritized event category comprising updated ticket inventory information comprises updating actual ticket inventory for the sellers so that published ticket listings reflect the updated actual ticket inventory available for sale by the sellers.

2. The method of claim 1, wherein the prioritization policy is based on a priority level of a seller and ensures that inventory updates from higher-priority level sellers are processed ahead of inventory updates from lower-priority level sellers.

3. The method of claim 2, wherein the priority level of the seller is based on one or more of number of listings, volume of sales, generated commission, feedback from buyers, and a paid premium.

4. The method of claim 1, further comprising
   matching updated ticket inventory information for an event against events recognized by the network-based system;
   creating a placeholder for an unmatched event; and
   submitting a mapping request for the unmatched event.

5. The method of claim 4, further comprising re-parenting the updated ticket inventory information or adding an alias to an event when the placeholder is mapped to an event.

6. The method of claim 1, wherein the prioritization policy ensures that multiple updates for a specific event listing are processed in order according to time received by the network-based system.

7. The method of claim 1, wherein the prioritization policy is based on event dates and ensures that updated ticket inventory information for an event having an event date occurring within a certain threshold time period is processed ahead of updated ticket inventory information for events having later-occurring event dates.

8. The method of claim 1, wherein the prioritization policy is based on on-sale dates and ensures that updated ticket inventory information for an event having an on-sale date occurring within a certain time period is processed ahead of updated ticket inventory information for events having on-sale dates occurring outside of the certain time period.

9. The method of claim 8, wherein the certain time period comprises a high-activity time period for ticket sales.

10. The method of claim 1, wherein:
    the prioritization policy is based on whether the updated ticket inventory information is deleting ticket inventory, adding ticket inventory, or updating ticket details; and
    the prioritization policy ensures that updated ticket inventory infoi nation that deletes ticket inventory for an event is processed ahead of updated ticket inventory information that adds ticket inventory or updates ticket details.

11. The method of claim 1, further comprising:
    matching updated ticket inventory information for a venue against venues recognized by the network-based system;
    creating a placeholder for an unmatched venue; and
    submitting a mapping request for the unmatched venue.

12. The method of claim 1, further comprising generating a ticket identifier in the event that the updated ticket inventory information received from a seller does not comprise a ticket identifier.

13. A non-transitory computer-readable storage medium comprising executable computer program instructions that when executed enable a computer system to:
    receive updated ticket inventory information from a plurality of sellers for multiple event listings at a network-based system;
    process, in parallel, the updated ticket information from at least two of the plurality of sellers;
    categorize the updated ticket inventory information from the sellers by event;
    prioritize event categories comprising updated ticket inventory information in accordance with a prioritization policy, wherein updated ticket inventory information for an event received between a first date based on an on-sale date of the event and a second date based on a date of the event is prioritized lower than updated ticket inventory information received earlier than the first date or later than the second date; and process a prioritized event category comprising updated ticket inventory information for a particular event listing out-of-order with respect to one or more other event categories comprising previously-received updated ticket inventory information for other event listings by updating actual ticket inventory for the sellers so that published ticket listings reflect the updated actual ticket inventory available for sale by the sellers.

14. The non-transitory computer-readable storage medium of claim 13, further comprising executable computer program instructions to:
match updated ticket inventory information for a venue against venues recognized by the network-based system;
create a placeholder for an unmatched venue; and
submit a mapping request for the unmatched venue.

15. The non-transitory computer-readable storage medium of claim 14, further comprising executable computer program instructions to generate a ticket identifier in the event that the updated ticket inventory information received from a seller does not comprise a ticket identifier.

16. The non-transitory computer-readable storage medium of claim 13, wherein the prioritization policy ensures that multiple updates for a specific event listing are processed in order according to time received by the network-based system.

17. The non-transitory computer-readable storage medium of claim 13, wherein the prioritization policy is based on one or more of event dates, on-sale dates, and a priority level of a seller.

18. The non-transitory computer-readable storage medium of claim 13, wherein the prioritization policy is based on whether updated ticket inventory information is deleting ticket inventory, adding ticket inventory, or updating ticket details.

19. The non-transitory computer-readable storage medium of claim 13, further comprising executable computer program instructions to:
match updated ticket inventory information for an event against events recognized by the network-based system;
create a placeholder for an unmatched event; and
submit a mapping request for the unmatched event.

20. A network-based system comprising:
a file accepting subsystem configured to receive updated ticket inventory information from a plurality of sellers for multiple event listings and process, in parallel, the updated ticket information from at least two of the plurality of sellers,
an event category creating subsystem configured to categorize the updated ticket information from the sellers by event, and to prioritize event categories comprising updated ticket inventory information in accordance with a prioritization policy, wherein updated ticket inventory information for an event received between a first date based on an on-sale date of the event and a second date based on a date of the event is prioritized lower than updated ticket inventory information received earlier than the first date or later than the second date, and
an event category processing subsystem configured to process a prioritized event category comprising updated ticket inventory information for a particular event listing out-of-order with respect to one or more other event categories comprising previously-received updated ticket inventory information for other event listings by updating actual ticket inventory for the sellers so that published ticket listings reflect the updated actual ticket inventory available for sale by the sellers.

* * * * *